United States Patent [19]
Garcia

[11] Patent Number: 5,848,193
[45] Date of Patent: Dec. 8, 1998

[54] WAVELET PROJECTION TRANSFORM FEATURES APPLIED TO REAL TIME PATTERN RECOGNITION

[75] Inventor: Joseph P. Garcia, Waldorf, Md.

[73] Assignee: The United States of America as represented by the Secretary of the Navy, Washington, D.C.

[21] Appl. No.: 833,482

[22] Filed: Apr. 7, 1997

[51] Int. Cl.[6] .................................................. G06K 9/36
[52] U.S. Cl. .......................................... 382/232; 382/199
[58] Field of Search ................................... 382/232, 235, 382/248, 199, 210, 278; 364/715; 378/210

[56] References Cited

U.S. PATENT DOCUMENTS

| | | | |
|---|---|---|---|
| 4,573,197 | 2/1986 | Crimmins | 382/197 |
| 5,220,614 | 6/1993 | Crain | 382/136 |
| 5,262,958 | 11/1993 | Chui et al. | 702/75 |
| 5,526,446 | 6/1996 | Adelson et al. | 382/275 |
| 5,668,850 | 9/1997 | Abdel-Malek | 378/210 |
| 5,745,392 | 4/1998 | Ergas et al. | 364/715.02 |

OTHER PUBLICATIONS

Joseph Garcia et al. Wavelet application, The International Scociety for Optical Engineering vol. 2242, pp. 936–949, Apr. 5, 1994.

Text ch 17, "From Neuron to Brain" of S.W. Kuffler, et al published 3rd ed. Sinauer Associates Inc., Sunderland MA. Receptive Field of Single Neurons in the Cat's Striate Cortex of Hubel et al published in J. Physiol. (Lond.) vol. 148. pp. 574–591, 1959.

Optical Wavelet Matched Filters for Shift–Invariant Pattern Recognition of Y. Shing et al published in Opt Lett. vol. 18 No. 4, pp. 299–302, Feb. 15, 1993.

Wavelets and Filter Banks: Theory and Design, of M. Vetterli et al published in IEEE Trans Image Proc., vol. 40, No. 9 pp. 2207–2232, Sep., 1992.

Image Coding Using Wavelet Transform of M. Antonini et al published in IEEE Trans. Image Proc., vol. 1, No. 2, pp. 205–220, Apr., 1992.

Neural Network for Scale—Invariant Data Classification of H. Szu et al published in Phys. Rev. E, vol. 48, No. 2, pp. 1497–1501, Aug., 1993.

Optical Feature Extraction of D. Casasant published in Optical Signal Processing J.L. Horner, ed. Academic Press, pp. 75–95, 1987.

Oscillatory Responses in Cat Visual Cortex Exhibit Inter–Columnar Synchronization which "Reflects Stimulus Properties" of C.M. Gray et al published in Nature v. 338, p. 334, 1989.

Coherent Oscillation: A Mechanism of Feature Linking in the Visual Cortex? of R. Eckhorn et al published in the Biol. Cyber, V. 60, p. 121, 1989.

*Primary Examiner*—Leo H. Boudreau
*Assistant Examiner*—Ishrat Sherali
*Attorney, Agent, or Firm*—James B. Bechtel, Esq.

[57] ABSTRACT

A computer vision system having improved means for characterizing the parameters of edge segments of an unknown object is disclosed. The unknown object is transformed by a digital camera into an image and transformed by a wavelet projection transform so as to decompose the unknown objects into their constituent multi-scale edge segment features and provide recognition of the unknown object by relating their constituent edge features to each other.

11 Claims, 12 Drawing Sheets

FIG.2
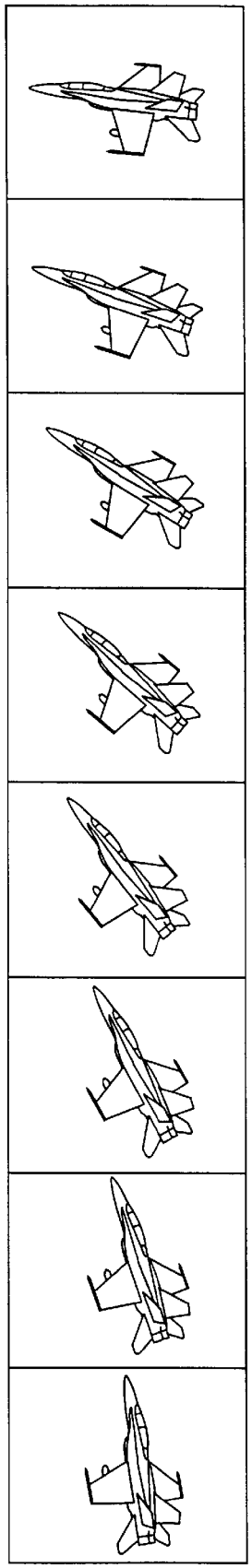
FIG.2(A)
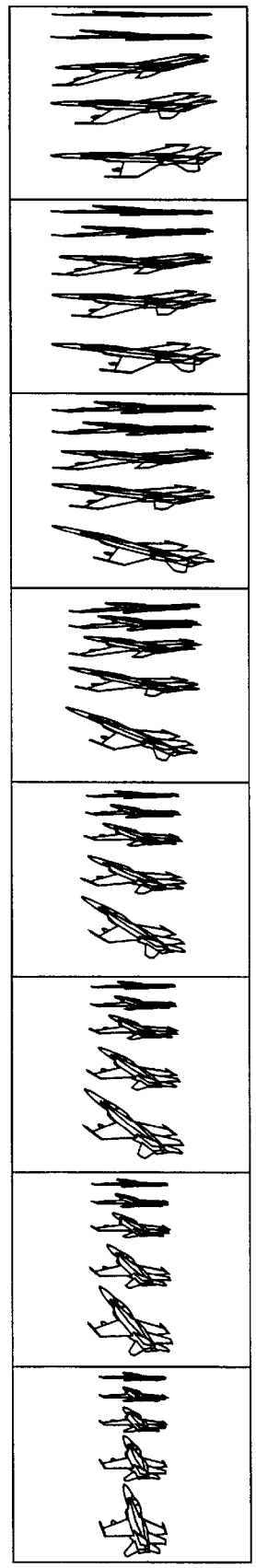
FIG.2(B)

FIG.4
FIG.4(A)
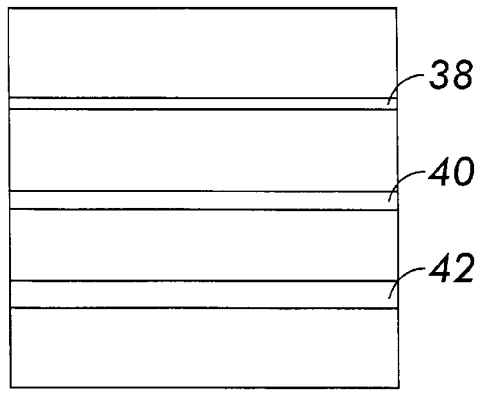
FIG.4(B)
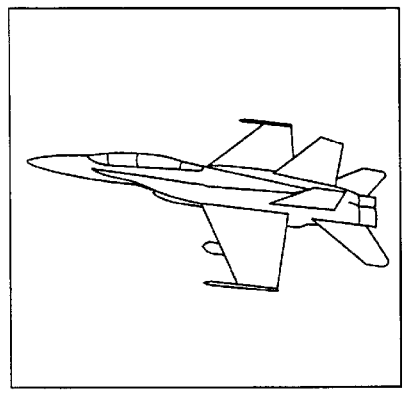
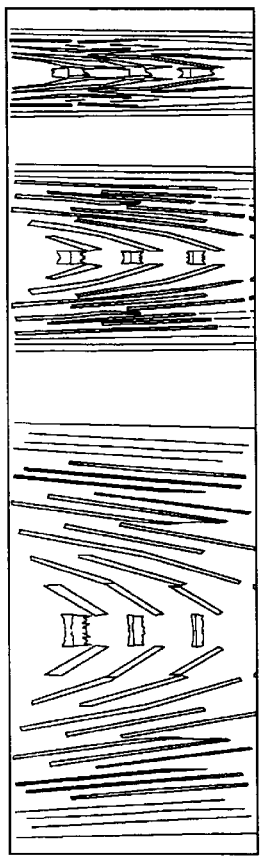 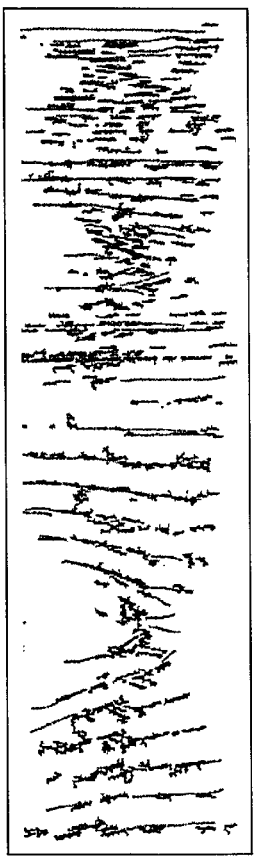 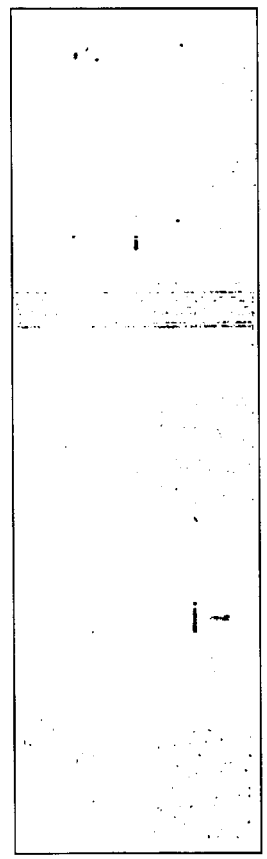 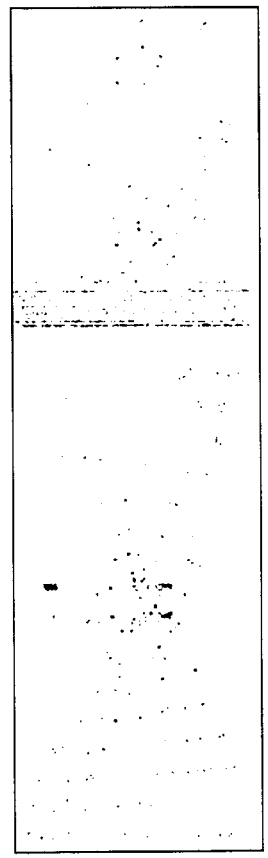
FIG.4(C)   FIG.4(D)   FIG.4(E)   FIG.4(F)

FIG.6
FIG.6(A)
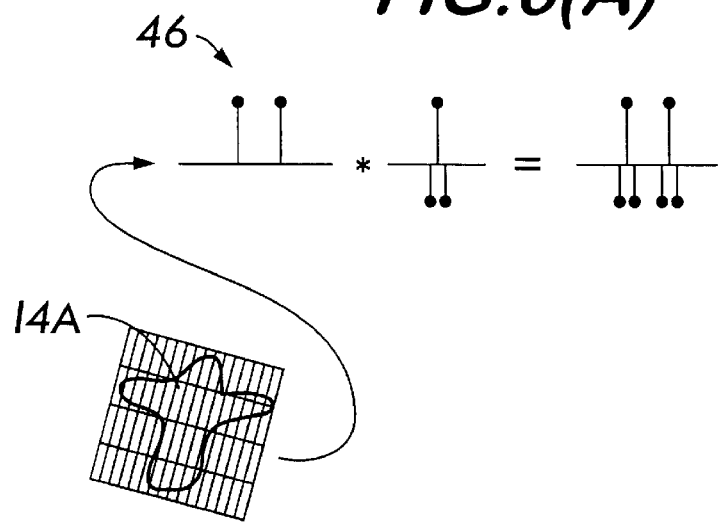
FIG.6(B)
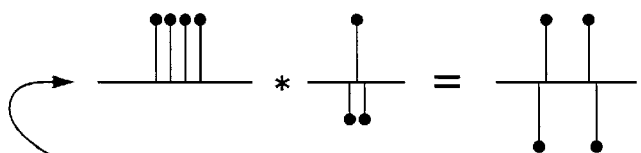
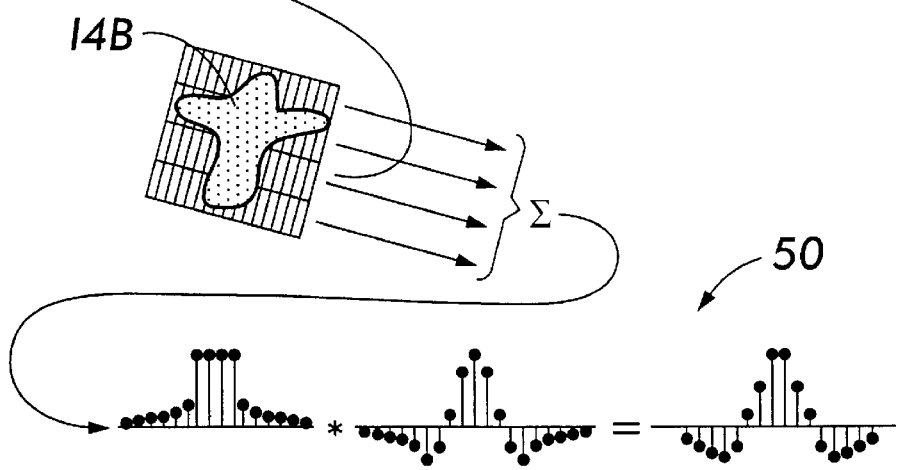

FIG. 7
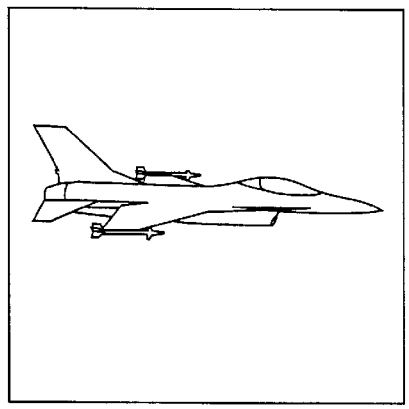
FIG. 7(A)
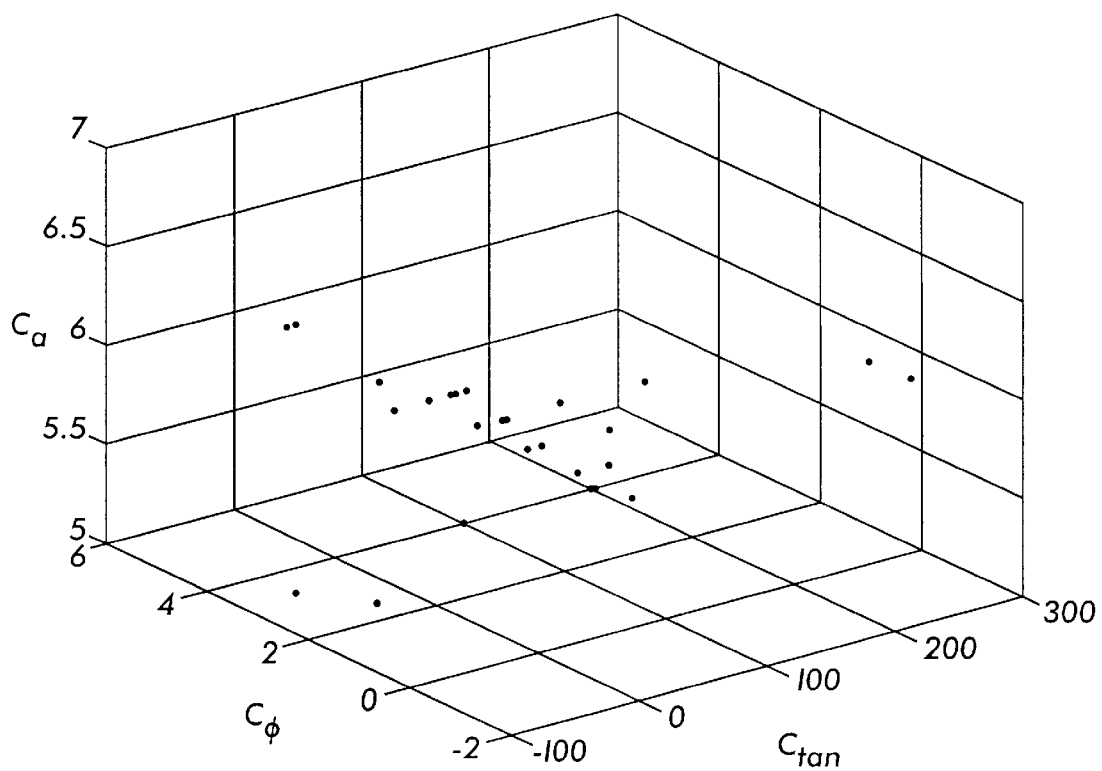
FIG. 7(B)

FIG.8
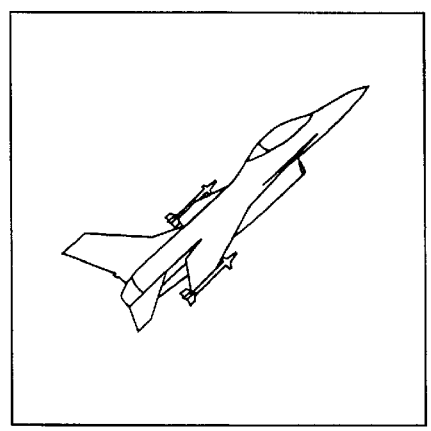
FIG.8(A)
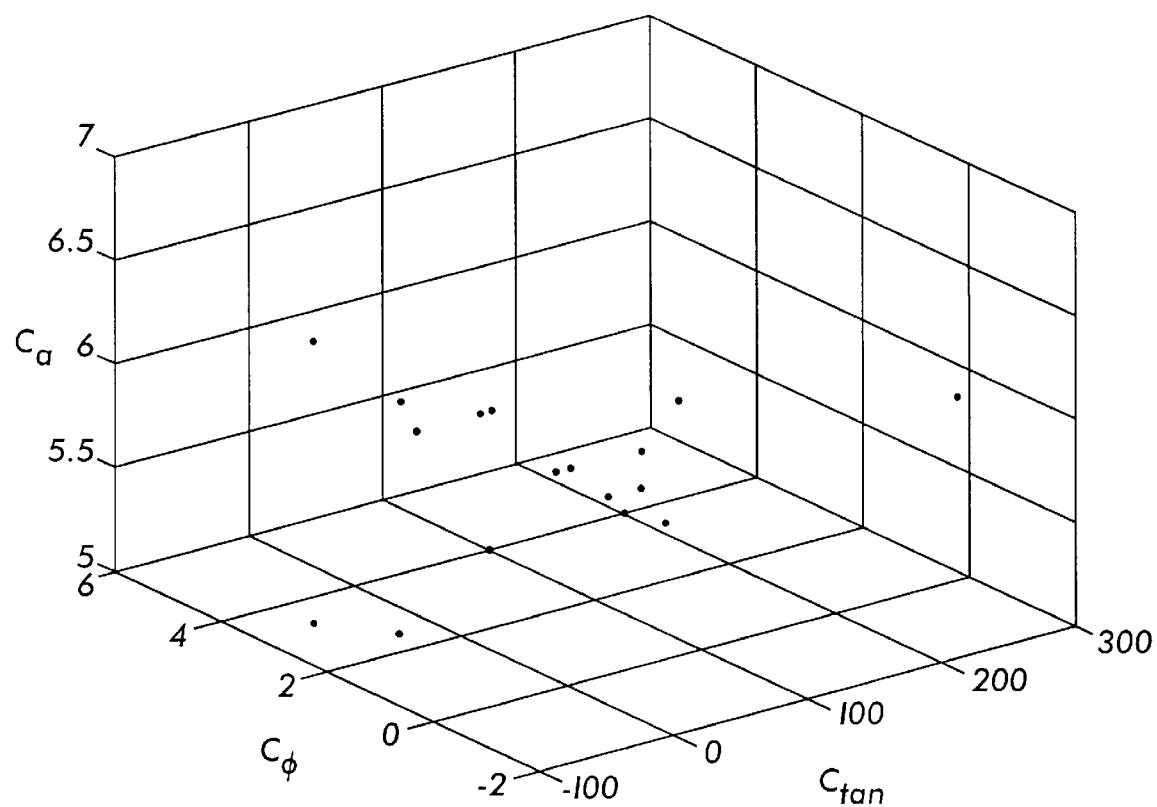
FIG.8(B)

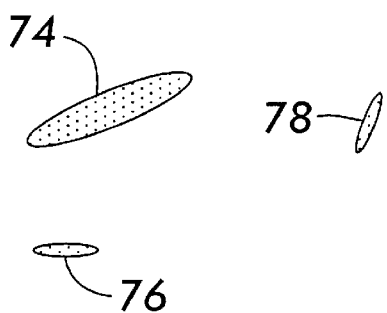
FIG.9
FIG.9(A)
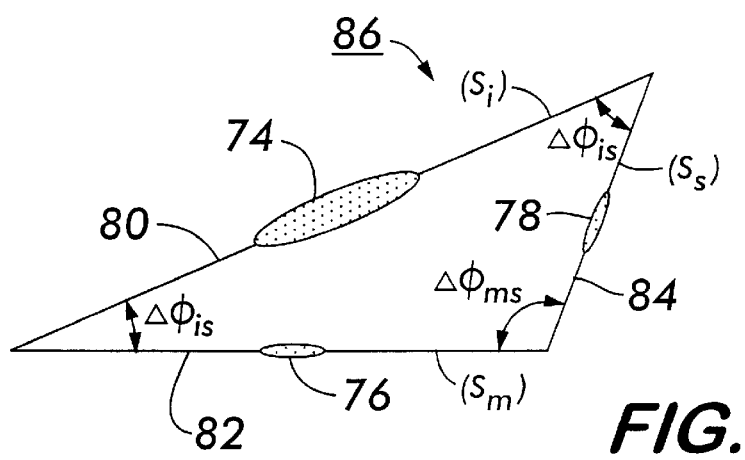
FIG.9(B)
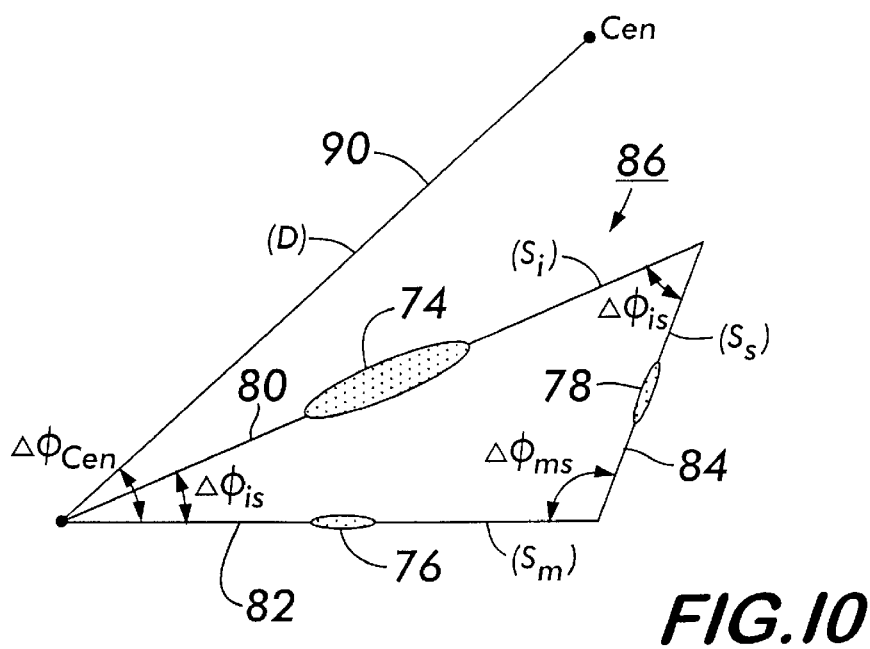
FIG.10

FIG.II
FIG.II(A)
FIG.II(B)
FIG.II(C)

FIG.12(A)
FIG.12
FIG.12(B)
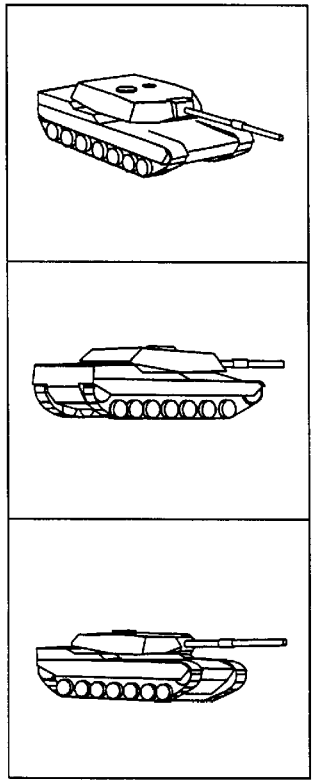
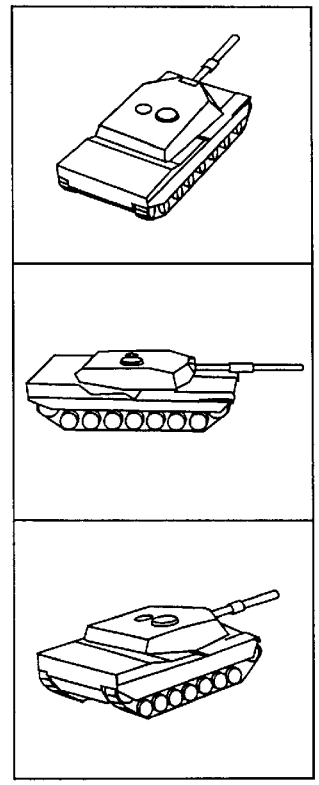
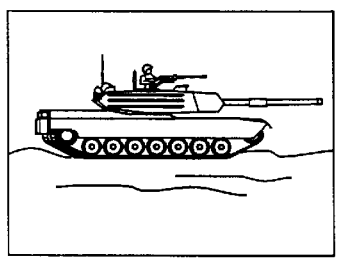
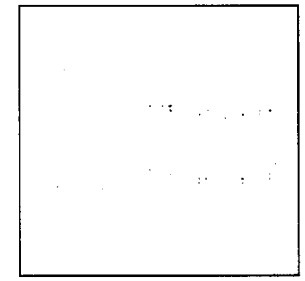
FIG.12(C)
FIG.12(D)
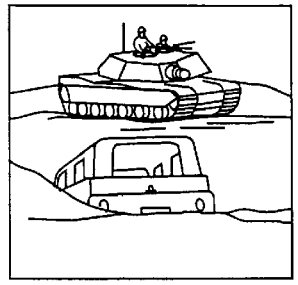
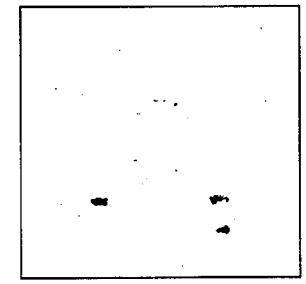
FIG.12(E)
FIG.12(F)

WAVELET PROJECTION TRANSFORM FEATURES APPLIED TO REAL TIME PATTERN RECOGNITION

STATEMENT OF GOVERNMENT INTEREST

The invention described herein was made by employees of the United States Government and may be manufactured and used by or for the Government for governmental purposes without the payment of any royalties thereon or therefor.

FIELD OF THE INVENTION

This invention relates generally to computer vision systems applicable to pattern recognition, automatic target recognition and, more particularly to a computer vision system having improved means for characterizing the images of unknown objects by decomposing them into their constituent multiple scale edge (MSE) features so as to reduce the processing requirements for the computer vision system for recognizing unknown objects and to provide for the recognition of an unknown object by relating their constituent edge features to each other.

BACKGROUND OF THE INVENTION

Computer vision systems find many applications in various fields such as automatic target recognition for military purposes, medical systems for the detection of tumors, and security and law enforcement systems for finger print identification and more recently face recognition of wanted criminals. Computer vision systems commonly employ representations which are associated with the creation and management of pictures, commonly referred to as images. The computer vision system typically has a digital camera that detects an unknown object having edges and converts the detected unknown object into an image represented by digital quantities that are extensively processed by known pattern recognition techniques so that the unknown object can be classified as being a known object. Biological research has influenced the development of computer vision systems for analysis and detection purposes and in doing so has considerably advanced pattern recognition techniques. An example of this is the field of Artificial Neural Networks. However, currently all computer vision systems, whether biologically influenced or not, are still limited to very restricted applications requiring controlled lighting and precise viewing aspects. These restrictions make computer vision systems impractical for numerous real world applications such as automatic target recognition (ATR). It is the object of this invention to perform a biologically motivated edge feature decomposition that significantly improves the robustness of a computer vision system to real world conditions characterized by uncontrolled viewing aspects and lighting conditions.

Research seems to indicate that, in the process of determining patterns, the brains of people and animals decompose images into constituent features. Biological vision systems that pursue this decomposition process are good at detecting outlines and boundaries of shapes which are some of the most basic features for pattern recognition processes as more fully described in the book of J. G. Nicholls and A. R. Martin, *From Neuron to Brain*, 3rd ed., Sinauer Associates Inc., Sunderland Mass., ch. 17, 1992, which is herein incorporated by reference. Hubel and Wiesel who are researchers in the neuro-biological field have shown that certain neurons involved in visual processing are orientation sensitive as more fully described in the technical article "Receptive Field of Single Neurons in the Cat's Striate Cortex," *J. Physiol.* (Lond.), Vol. 148, pp. 574–591, 1959 and as also described in the already mentioned technical article of Kuffler et al, as well as the textbook of E. R. Kandel, J. H. Schwartz and T. M. Jessell, *Principles of Neural Science*, 3rd, ed., Elsevier, N.Y., chs. 29–30, 1991, all of which are herein incorporated by reference.

As is known, any edge has the properties of orientation and position (in at least two dimensions). Less obvious is that any edge has the property of scale. Scale is an important property of edges that biological systems seem to be better at characterizing than artificial vision systems. Scale pertains to the "sharpness" of a boundary section. For example, the boundary between the wing and fuselage of a blended wing style aircraft appears gradual at close range but sharper at longer range. An exterior edge, e.g., the edge between the wing and background, appears sharp at any range. The sharpness of interior edge segments is a function of the viewing distance. We use the term scale herein to characterize the size and sharpness of some edge feature due to viewing distance. The edge segment of an object with regard to its scale is referred to as being a multi-scale edge segment (MSES).

Edge segments are difficult to quantify. For one reason an edge segment defines two different levels of position resolution, i.e., the lengthwise and the transverse lengthwise. The positional resolution along the former is much less than that of the latter. For example, relative to a fixed background, minute shifts in the transverse lengthwise direction are perceptible, whereas equivalent shifts in the lengthwise direction are imperceptible. Therefore, the location precision along the length of an edge segment is much less than across the edge segment. Furthermore, the more precise the measurement of the orientation, the less precise the lengthwise position. This is because orientation measurement is an integration process whereas the transverse lengthwise position measurement is a differentiation process. In other words, to measure the orientation of an edge segment, one does a series of integrations over a range of directions, the direction parallel to the edge segment will output the largest integral value. The directional increments and integration length depend on how the edge segment is defined. This has to do with how one defines the ratio of the edge segment's length to its width. The integration length will be a multiple of the edge segment width. The integration process destroys the resolution within this region. This means that the positional uncertainty along the lengthwise direction is some multiple of the scale. The width is proportional to the scale. Therefore the integration length is a function of scale.

On the other hand, to measure the transverse lengthwise position one performs differentiation along a range of directions. Along these directions there will be a transient corresponding to the edge. The transient along the direction perpendicular to the lengthwise direction will generate the largest output of the differentiation operator for the various directions of differentiation. The resolution of the transverse lengthwise position is ultimately limited by the pixel resolution, i.e., the digital camera pixel's instantaneous field of view (IFOV). A transform that gives good resolution of an edge's orientation will give poor resolution of its position along the lengthwise direction. This is analogous to the case in time series signal processing where a filter that has good frequency resolution has poor time resolution. Because of this imprecision, the exact position of an edge segment along its lengthwise direction may be completely arbitrary within some range of resolution corresponding to its scale. The inability to effectively characterize the constituent edge segments of an image with regard to the widely varying scales and directional resolutions renders difficult the ability to determine the parameters of the image which, in turn, hinders the ability to identify the unknown object under consideration, thereby, preventing the related computer vision system from performing its desired task of pattern recognition. It is desired that improved means be provided for effectively characterizing multi-scale edge segments (MSESs) of unknown objects. Recent wavelet approaches developed in the last decade may embody the above described aspect of biological systems, namely, the ability to characterize multi-scale edge segments (MSESs) which have properties such as scale orientation and position.

SUMMARY OF THE INVENTION

It is therefore a primary object of the present invention to decompose an image of some object into its multi-scale edge segment (MSES) components, MSESs applying to both exterior (outline) and interior edge components.

It is another object of the present invention to provide a computer vision system having means for effectively determining the position, orientation and scale of the edge segments of objects within the respective resolution limits imposed by the nature of multi-scale edge segment (MSES) measurement process.

It is another object of the present invention to provide improved means for determining multi-scale edge segments of images of objects and to do so without unduly burdening the processing requirements of conventional computer architectures used in computer vision systems.

Another object of the present invention is to provide improved pattern recognition of unknown objects having multi-scale edge segments by utilizing biological aspects invoked by human brains in what is commonly known as the early vision system while performing pattern recognition of unknown objects.

It is still a further object of this invention to utilize a transform, herein referred to as the wavelet projection transform (WPT), that maps a two dimensional image of an object into a four dimensional transform domain, and consists of a Cartesian rotational transform, a recursively applied digital low pass filter and a continuous wavelet transform (CWT) for the improved means for representing MSESs with their orientations, scales, and positions during the performance of pattern recognition by a computer vision system.

It is still another object of this invention to apply a peak detection process to the WPT domain (or the transform domain of a similar transform) for the purpose of determining the locations of peaks along the direction corresponding to the transverse lengthwise direction of MSESs.

It is still another object of this invention to analyze the pattern of peaks from the aforementioned peak detection process in order to determined the positions and types of multi-scale edge segments (MSESs) along the direction corresponding to the transverse lengthwise direction of MSESs.

It is still another object of this invention to compare- multi-scale edge segments based on their peak intensity over multiple orientations in the WPT domain (or the transform domain of a similar transform) for the purpose of determining the "best" MSES representative quantities to represent a particular MSES.

It is still another object of this invention to take the efficient edge characterization of the processed WPT (or processed transform domain of a similar transform) and derive shift, scale and rotationally invariant relations among two or three MSES representative quantities in the form of ratios or differences in the various WPT parameters.

It is still another object of this invention to characterize a known object, from herein referred to as the prototype object, by applying the above described processes to images of all aspect views of the prototype and forming a library of derived invariants representing the above prototype.

It is still another object of this invention to apply the above to the image of an unknown object and detect matches between the derived invariants derived from the unknown object and those of the library derived from the prototype objects.

It is still another object of this invention to apply a process to the above matches so that if the input image of the unknown object contains a pattern that corresponds to the prototype object represented in the library, the matches of the derived invariants are found to be coherent with respect to each other in a manner that signals representing the matches superpose coherently and through a match filtering operation, the coherence may be detected in a manner indicating the recognition of the unknown object.

BRIEF DESCRIPTION OF THE DRAWINGS

FIG. 2 is composed of FIGS. 2(A) and 2(B) respectively illustrating an image of an F-18 aircraft being rotated over a range of angles and the images resulting from bi-orthogonal wavelet applied along the columns of the various rotations used to implement the transform processing of the F-18 image of FIG. 2(a).

FIG. 4 is composed of FIGS. 4(A), 4(B), 4(C), 4(D), 4(E) and 4(F) illustrating related parameters derived by the wavelet projection transform (WPT) of the present invention.

FIG. 6 is composed of FIGS. 6(A) and 6(B) that illustrates peaks associated with lines and edges of the transform image of FIG. 1.

FIG. 7 is composed of FIGS. 7(A) and 7(B) that respectively illustrate an image of a F-16 fighter and a chordal invariant representation of the image of FIG. 7(A).

FIG. 8 is composed of FIGS. 8(A) and 8(B) that respectively illustrate the F-16 fighter image of FIG. 7(A) rotated 45 degrees and dilated 25%, and a chordal invariant representation demonstrating the rotation and scale invariance of the image of FIG. 8(A).

FIG. 9 is composed of FIGS. 9(A) and 9(B) that respectively illustrate separated multi-scale edge features and a multi-scale edge feature interconnected to form a triangle.

FIG. 10 illustrates a chordal triangle (CT) quantity having a prime vertex associated with the practice of the present invention.

FIG. 11 is composed of FIG. 11(A), 11(B) and 11(C) illustrating three phases associated with the noise coding of the present invention.

FIG. 12 is composed of FIGS. 12(A), 12(B), 12(C), 12(D), 12(E) and 12(F) illustrating selected aspects of a M1 tank and noise coding stages.

DETAILED DESCRIPTION OF THE PREFERRED EMBODIMENTS

Figure 1:
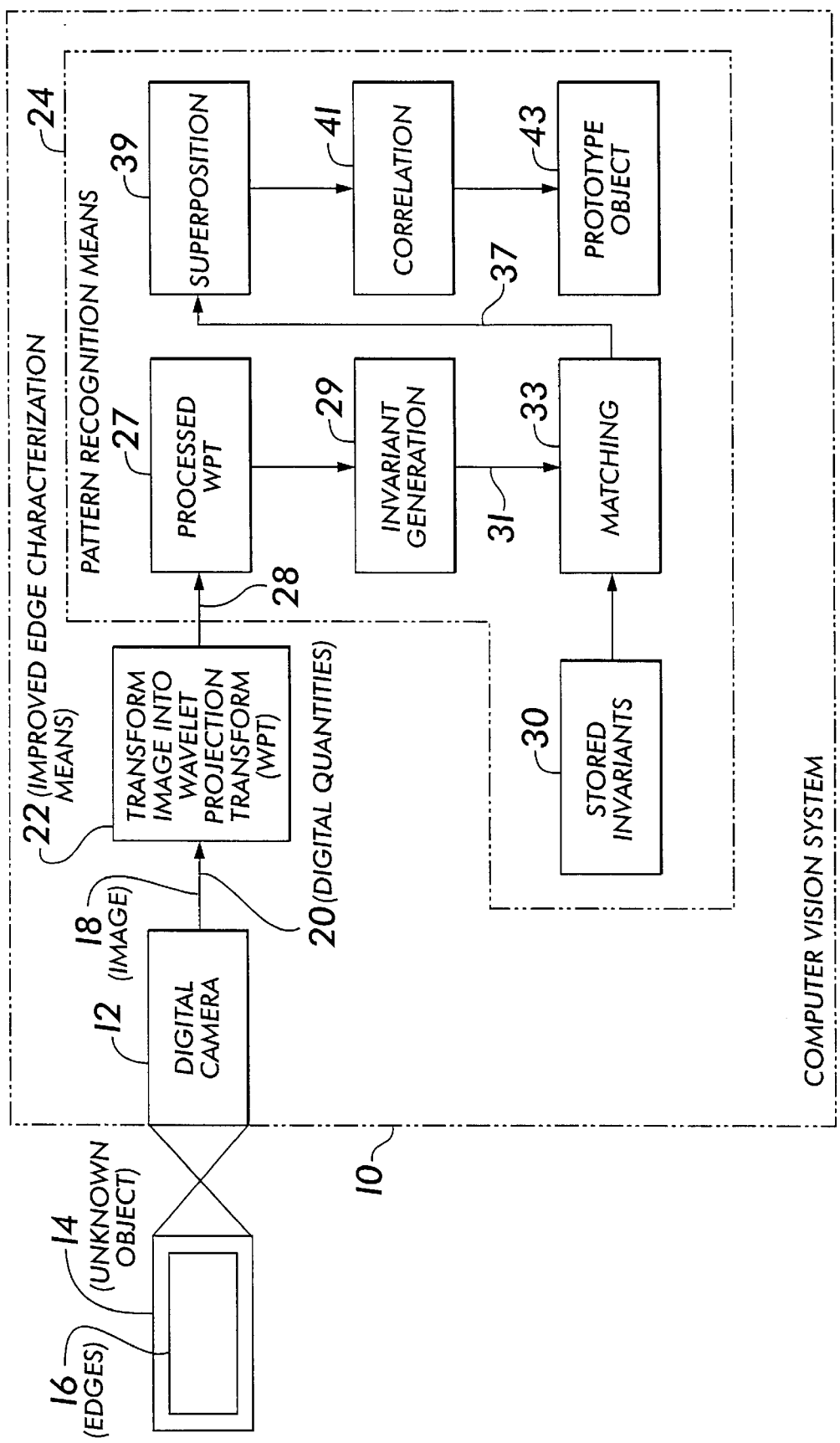
FIG. 1 is a block diagram of a computer vision system generally illustrating the operation thereof in accordance with the practice of the present invention.

With reference to the drawings, wherein the same reference numbers indicate the same elements throughout, there is shown in FIG. 1 a block diagram of a computer vision system 10 whose operation is in accordance with a method of the present invention.

In general, the computer vision system 10 may find application in various fields, such as automatic target recognition for military purposes, medical systems for the detection of tumors, or security and law enforcement systems for identification of wanted criminals. Computer vision systems are well known, such as that disclosed in U.S. Pat. No. 4,573,197 teaching the implementation of Fourier coefficients to define the boundaries of an unknown object, or U.S. Pat. No. 5,220,614 disclosing a method and system for automatically grading the quality of coins, both of which are herein incorporated by reference.

The principles of the present invention primarily concerned with the computer vision system 10 can be practiced in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. As will be described, the principles of the present invention provide for a simplification of the representation of edge information giving rise to lower processing requirements and thus permitting the automatic pattern recognition of the present invention to be practiced on conventional computer architectures.

The principles of the present invention are particularly suited to provide a method of operating a computer vision system, having a digital camera outputting a digital image, for recognizing an unknown object having multi-scale edge segment components by converting the digital image into a particular representation. In one embodiment, the method comprises the steps of: (a) transforming by a wavelet projection transform (WPT) the digital image into a first four (4) dimensional transform having transform domain space dimensions corresponding to position (two dimensions), scale and orientation; (b) processing the four dimensional transform to find a set of points most representative of the image's constituent MSESs so as to yield an efficient edge feature decomposition of the digital image; (c) grouping at least two MSES representative quantities into groups whereby a particular group is referable to as a location of a particular MSES representative quantity; (d) deriving a set of invariant relations having associated parameters between at least two MSES representative quantities of the group of step (c), the derived set having specific invariances which include shift, scale and rotation invariance within an aspect view; (e) applying steps (a), (b), (c), and (d) to multiple aspect views of a prototype object and deriving a set of invariants having associated parameters for the multiple aspect views and forming a library of invariants corresponding to the prototype objects and applying the steps (a), (b), (c) and (d) to the image of an unknown object; (f) correlating the set of invariant relations of said step (d) to the set of invariant relations of step (e) and for the matches, generating least four dimensional digital signals which are representative of a particular class of prototype objects and have phases which are functions of MSES representative quantities corresponding to invariants derived from the unknown image and parameters associated with the invariants derived from the prototype object; and (g) superposing the representative signals of step (f) and storing the results such that if a pattern in the input image corresponds to a pattern represented in the library, the generated signals will superpose coherently with the coherent superposition detectable by a matched filtering operation using a reference signal derived from the representative class signal, the matched filtering operation yielding a correlation peak indicating the recognition of the unknown object, the position of the correlation peak indicating the position of the recognized unknown object.

In general, the computer vision system 10 has a digital camera 12 that detects an unknown object 14 having edges 16. The digital camera 12 converts the detected object into an image 18 represented by digital quantities 20 that are directed into improved edge characterization means 22 that, along with an illustrated pattern recognition means 24, is of importance to the present invention. The computer vision system 10 may be a stand alone machine having a conventional central processor unit (CPU) or it may be treated as a terminal in the form of its digital camera 12 that routes its image 18 to a conventional central processor unit (CPU). The improved edge characterization means 22 comprises routines that are resident in the computer vision system 10 that transform the image, by means of a wavelet projection transform (WPT), to provide at least a four (4) dimensional (D) signal 28. The signal 28 is further processed by WPT post-processor segment 27 and invariant generation 29 so as to derive invariants on signal path 31 that is routed to matching segment 33. The system contains a library of stored invariants 30 generated from multiple aspect views of prototype objects in which the prototype views are devoid of background objects. The matching segment correlates the set of invariant relations derived from the input image of the unknown object to the stored invariants of 30 with a correlation therebetween identifying the relations between MSESs in the unknown object 14. Upon positive correlations or matches, representative four (4) dimensional signals on signal path 37 are generated for the matches between the invariants derived from the input and the stored invariants derived from the prototype objects of interest. The 4D signals undergo a superposition process in superposition segment 39, the output of which is conveyed to the correlator 41. The superposition is correlated with four (4) dimensional signals representative of classes of the prototypes of which a strong correlation signal indicates the recognition of the unknown object, i.e., the unknown object being in the same class as a particular prototype object 43.

U.S. Pat. No. 5,262,958, herein incorporated by reference, discloses the use of an integral wavelet transform (IWT) in signal procession applications that has computational benefits relative to the techniques involving Fourier transformations. Projection transforms, such as a Hough transform, have been developed for computer vision systems and are more fully described in the text of D. H. Ballard, and C. M. Brown, *Computer Vision*, Prentice-Hall, Englewood Cliffs, N.J., 1982 with the applicable sections thereof being incorporated by reference. The Hough transform maps or transforms a line of a particular orientation into a point. For example, consider the discretized image $\mu(x,y)$ where $x,y \in [-n/2, (n-1)/2]$, the Hough transform of $\mu$ is of the form:

$$\lambda(\phi,x') = \sum_{y'=-n/2}^{(n-1)/2} \mu(x',y'), \quad (1)$$

$$\begin{pmatrix} x' \\ y' \end{pmatrix} = \text{integer}\left( \begin{bmatrix} \cos(\phi\pi/m) & \sin(\phi\pi/m) \\ -\sin(\phi\pi/m) & \cos(\phi\pi/m) \end{bmatrix} \begin{pmatrix} x \\ y \end{pmatrix} \right),$$

where the primed coordinates represent the body-center rotation at orientations indexed by $\phi \in [-m/2, (m-1)/2]$ in which x' is the transverse integration direction position of the edge of an object, such as object 14 of FIG. 1, and y' is the integration direction along the length dimension of the edge of object 14 with both the length and transverse properties being those described in the "Background" section. The above (expression (1)) transform is a global transform along the parameter $\phi$. This means that the information represented by expression (1) is distributed over the entire transform, thereby effectively losing the positional resolution along the segment in the y' integration direction. In practice a local projection transform would map an edge segment into a point in the transform space, but would maintain some position resolution in the y' integration direction that would be on the order of the edge segment's length. If the integration length were to be controlled by a scale factor, it would be a scalable local projection transform. This sets the stage for the Wavelet Projection Transform.

The transform implemented by the present invention, in particular, the improved edge characterization means 22 of FIG. 1 is a scalable local projection transform having a wavelet based edge detection and is herein termed "wavelet projection transform (WPT)" having the form of a 2-D convolution product given as follows:

$$\Lambda(\phi,a,X,Y) = \sum_{x'=-n/2}^{(n-1)/2} \sum_{y'=-n/2}^{(n-1)/2} \mu(x',y') f[s(a)k_s, s(a)k_s Y - y'] \psi[s(a)K_s, X - x']. \quad (2)$$

where f and $\psi$ are scalable kernels each taking two arguments, one argument determining the scale, the other determining the position. The function f is a low pass filter function such as gaussian or square weighting function with $s(a)k_s$ being the scale argument, itself the product of a scaling function $s(a)$ and scale factor $k_s$ where $a \in Z^+$ is the scale index. The index Y corresponding to the integration direction is weighted by $s(a)k_s$ so that the number of indices is inversely proportional to scale, i.e., fewer indices are required for coarse scales than for fine scales. This scaled kernel approach is chosen so that information is concisely represented by the number of indices. Because there is uncertainty of position property of the edge segment along the integration direction and because this uncertainty increases with scale, this scaled kernel approach applied to f is an efficient method of characterizing MSESs to the resolution limits of their components. To detect edges intersecting the x' direction, that is, the transverse integration direction, we apply the continuous wavelet transform (CWT) where $\Psi(.)$ is a wavelet and is a function of a as f is. The continuous wavelet transform (CWT) is more fully described in the technical article of Y. Sheng, D. Roberge, H. Szu, and T. Lu "Optical Wavelet Matched Filters for Shift-Invariant Pattern Recognition," *Opt Lett.*, Vol. 18, No. 4, pp. 299–302, Feb. 15, 1993 and which is herein incorporated by reference.

In general, and as to be further described hereinafter, the method of the present invention, in one embodiment, treats a digital image 18 as an ordered list of digital values being representative of a two dimensional field of intensities or pixels, having two canonical axes corresponding to the directions along the rows and columns of pixels. The digital image 18 is transformed by a wavelet projection transform (WPT) by: 1) generating rotated copies of the input digital image via a Cartesian rotational transform, incrementating over a range of orientations; 2) for the rotated copies, integrating about the columns for each instantaneous orientation by recursively applying a digital low pass (LP) filter with downsampling, generating multiple levels of output quantities, the level a function of the row number, the digital low pass filter having filter coefficients selected from a known low pass section of a discrete wavelet transform filter bank; 3) upon the rotated copies of step 2, differentiating along the rows using the CWT, the scale of the CWT a function of the level of the DWT, the level a function of the row number. In the application of the above steps, columns and rows of the rotated copies may be interchanged in steps 2 and 3 as long as consistency is maintained over the entire transform. The scaling is most efficient when the scaling function is logarithmic. Furthermore, the scaling incorporated into f and $\psi$, is most convenient for digital computer implementation when it explicitly takes the value of two (2) to some positive integer power.

Returning to step 2 for the rotated copies, recursion refers to the successive reapplication of the LP filter to its own output signal. The number of times a signal has proceeded through the LP filter is referred to as its level. Downsampling refers to throwing out every other sample, also known as decimation by two. A copy of the decimated output is saved for each level of the LP filter before sending it to the next level. Performing this operation is mathematically equivalent to integrating across multiple rows (along columns) where the number of rows in the integration is determined by the scale variable a as is the case for f in the previous expression (2) for $\Lambda$. For the example embodiment of the invention, the LP filter performing the digital convolution uses the same filter coefficients from the LP section of a digital wavelet transform (DWT) filter bank. This is because the filters used in the DWT have certain mathematical properties that make them invertible. The invertability property is desirable for reconstructing an image from its corresponding WPT. The discrete wavelet transform (DWT) is more fully disclosed in the text by I. Daubechies, *Ten Lectures on Wavelets*, SIAM Press, Philadelphia, Pa, 1992, with the applicable sections thereof being herein incorporated by reference. The implementation of the DWT involving digital filter banks using recursion and downsampling, sometimes referred to as the quadrature mirror filter (QMF), is more fully described in the following three (3) technical articles of the given authors all of which articles are herein incorporated by references: 1) M. Vetterli and C. Herley, "Wavelets and Filter Banks: Theory and Design," *IEEE*

Trans. Image Proc., Vol. 40, No. 9, pp 2207–2232, Sep. 1992; 2) M. Antonini et al, "Image Coding Using Wavelet Transform," IEEE Trans. Image Proc., Vol. 1, No. 2, pp. 205–220, Apr. 1992; and 3) G. Strang and T. Nguyen, *Wavelets and Filter Banks*, Wellesley-Cambridge Press, Wellesley, Mass., 1996.

The above starting with the description related to expression (2) completes the general description of the wavelet projection transform (WPT), and following the application of the above method of the present invention, the next stage is to generate a limited number of MSES representative quantities corresponding to the "best" points in WPT space, i.e., the points in WPT space most representative of various MSESs. The output of this stage, to be further described hereinafter, is referred to as the Processed WPT. The purpose of this stage is to foster computational efficiency.

Wavelet Projection Transform (WPT) Processing

Figure 3:
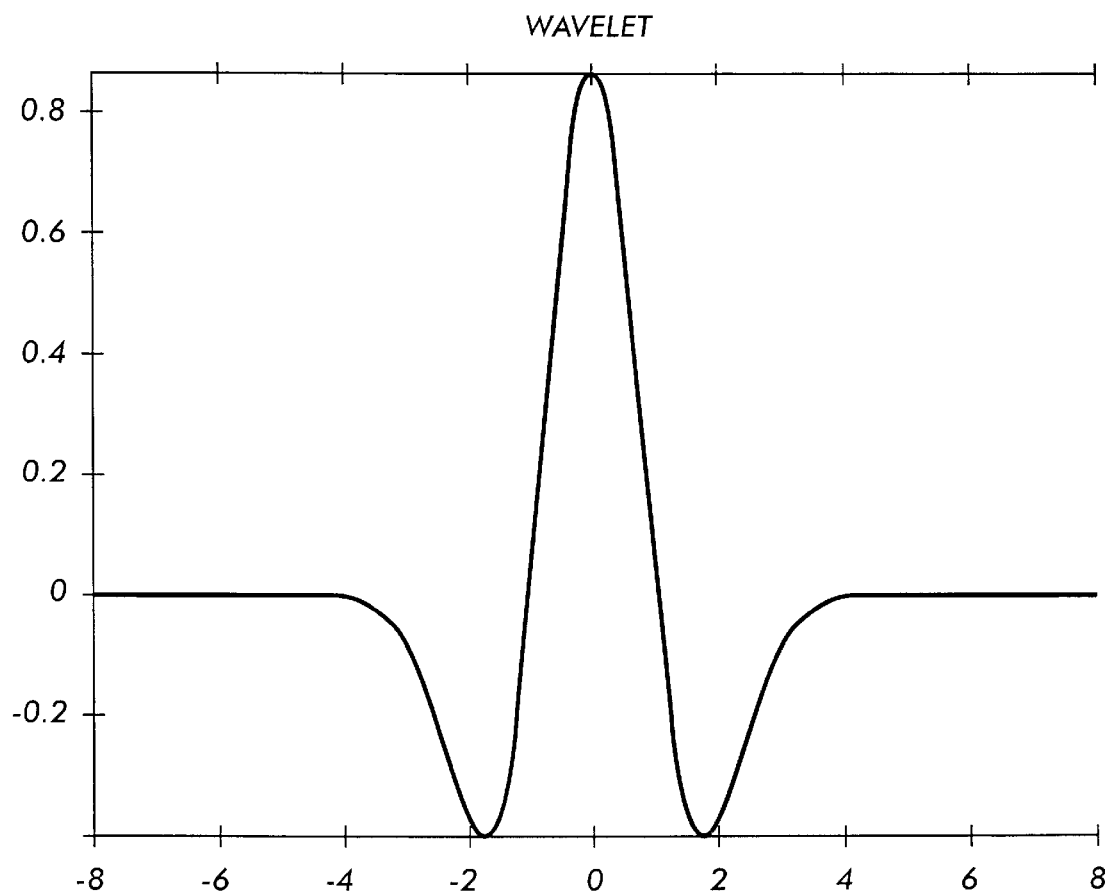
FIG. 3 illustrates a Mexican hat wavelet.

In the practice of the present invention, a wavelet projection transform (WPT) was performed on an image of an F-18 fighter plane serving as the unknown object 14 of FIG. 1, and the results of the performance may be described with reference to FIG. 2 composed of FIG. 2 (A) illustrating an image of the F-18 rotated over a range of angles, and of FIG. 2(B) illustrating a multi-scale local projection corresponding to the image of FIG. 2(A). The rotation of the F-18 image of FIG. 2(A) is illustrated in a series of frames. FIG. 2(B) shows the application to the above rotations of the 9-7 coefficient bi-orthogonal wavelet that is more fully disclosed in the aforementioned technical article of M. Antonini. A Mexican hat wavelet illustrated in FIG. 3 is applied in the in the transverse integration direction with functional form:

$$\psi[2^a K_s, x] = \left( \frac{4x^2}{(2^a K_s)^2} - 2 \right) \exp\left\{ -\frac{x^2}{[2^a K_s]^2} \right\} \quad (3)$$

Any type of function for $\Psi$ may be used provided it satisfies the mathematical requirements for wavelets. These requirements are further detailed in the text of Daubechies previously mentioned. Other examples of wavelets are the Morelet wavelet, the first derivative of a gaussian and all such wavelets being known in the art.

In the further practice of the present invention a test image was implemented in the wavelet projection transform (WPT) processing and the results are illustrated in FIG. 4 comprising FIG. 4(A), 4(B), 4(C), 4(D), 4(E) and 4(F). FIG. 4(A) represents a test image containing edges at three different scales indicated thereon as three sequentially increasing scales 38, 40 and 42. FIG. 4(B) is the F-18 fighter image previously shown rotated in FIG. 2(A). FIG. 4(C) is the wavelet projection transform (WPT) of the test image, while FIG. 4(D) is the wavelet projection transform (WPT) of the F-18 image of FIG. 4(B). FIGS. 4(E)and 4(F) represent the processed WPT of the respective images. Each point in these two FIGS. 4(E,F) represents "the best" MSES for a local region.

Figure 5:
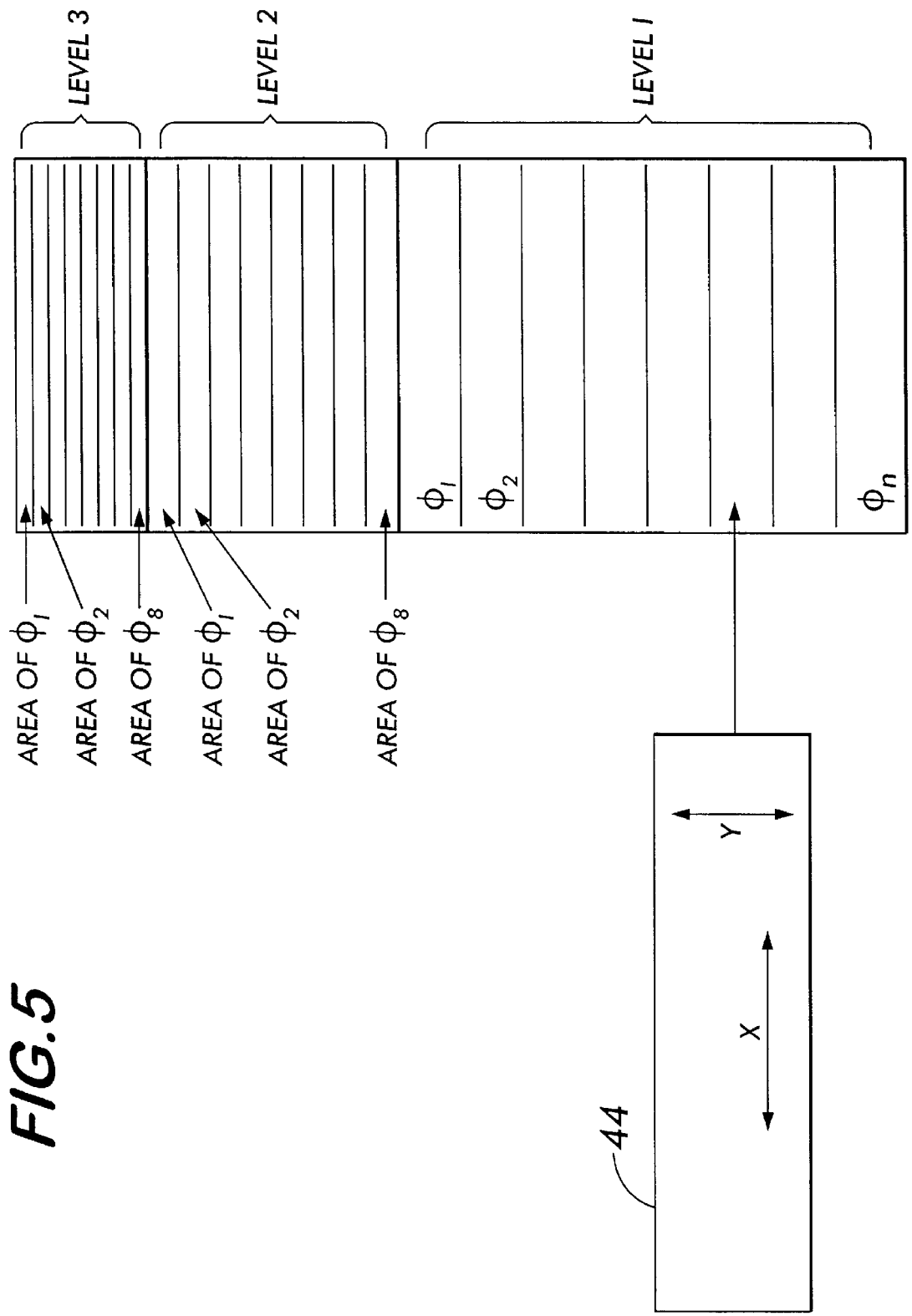
FIG. 5 illustrates various scales of the wavelet projection transform (WPT) related to the present invention.

The wavelet projection transform (WPT) processing performed by the computer vision system 10 of FIG. 1 has various regions denoted level1, level2 and level3 corresponding to scales, $a_1$, $a_2$ and $a_3$ and various subregions denoted orien1, orien2, . . . , orien8 corresponding to $\phi_1$, $\phi_2$. . . $\phi_8$ all illustrated in FIG. 5. FIG. 5 illustrates a wavelet projection transform (WPT) space representation having three (3) spatial scales (levels 1, 2 and 3) and eight orientations. In each orien1, orien2, . . . ,orien8 there is two dimensions corresponding to the X and Y directions and indicated in FIG. 5 by rectangular box 44. Both wavelet projection transforms (WPTs), as well as the discrete wavelet transform (DWT) and the continuous wavelet transform (CWT), are over three spatial scales (3–5 levels down), with the lowest resolution (e.g., level 3) on the top and the highest (e.g., level 1) on the bottom as generally indicated in FIG. 5. For each scale ($a_1$, $a_2$ or $a_3$ of FIG. 5) the horizontal direction represents the transverse segment length position, while the vertical direction represents the orientation between 0–180 degrees of the image under consideration.

The post wavelet projection transform (WPT) processing is used to identify "the best" MSES representative quantities shown in FIGS. 4(E) and 4(F). For such post (WPT) processing, the first step involves application of peak detection along the X direction of the WPT to find both positive and negative peaks. This is related to Marr's work on zero crossings which is further described in the book *Vision* authored by D. Marr and published by Freeman, San Francisco, 1982, with the applicable sections thereof being incorporated herein by reference. The peak detection process itself is well understood and is not considered part of this invention. Upon determining a number of peaks along the X direction in a particular orientation, in a particular row, the next aspect is to find a MSES representative quantities from a group of contiguous peaks and in so doing it is necessary to describe the distinction between two types of MSESs. In the WPT of some arbitrary shape, consider the X direction in the fine scale region of the WPT orientation corresponding to the shape's orientation which may be further described with reference to FIG. 6.

FIG. 6 is composed of FIGS. 6(A) and 6(B) respectively illustrating an outline image 14A and solid image 14B both of which are captured by rows and columns of an overlaid grid representing the instantaneous orientation of the WPT whereby the grid elements along the length represent the integration of pixels for the fine scale. The rows are defined along the directions perpendicular to the long direction of the grid elements. The integration along a single row corresponding to the fine scale is shown respectively for FIGS. 6(A and B) by the upper arrows. The integration along all four rows corresponding to the coarse scale is shown by the lower arrow in FIG. 6 (B). Here the output corresponds to the columnwise summation represented by "$\Sigma$" for each position along the row direction. The fine scale outputs for the single rows for the respective shapes are shown in convolution operations 46 and 48 where "*" is the convolution operator and the function to the immediate right of the convolution operator is the fine scale of the Mexican hat wavelet. The convolution output on the righthand side of the equal sign (=) is the fine scale output for the instantaneous orientation of the WPT represented by the overlaid grid in 14A and 14B. At each transient point corresponding to the integration, there are multiple peaks on the convolution output. This is referred to as ringing. To resolve distances between transients, peaks from distinct transients must be separated beyond the separation of the ringing peaks associated with the particular transients. This is the case for 48. As with the fine scale, the coarse scale integration in 14B is shown in a convolution operation 50 with the coarse scale of the Mexican hat wavelet shown right of the convolution operator. The output of the convolution is the coarse scale output the instantaneous orientation of the coarse scale WPT. Here there is a ringing pattern associated with only one transient because the scale of the wavelet is on the order of the scale of the width and thus it is not possible to resolve the separation between the transients defined by the left and right sides of the integration of image 14B.

Retuning to the fine scales, consider the distinction between 46 and 48. The output of the fine scales 46 and 48 has two groups of peaks, however the output of 46 represents two spatial structures, i.e., two fine lines, while the output 48 represents one spatial structure, i.e., one thick line with sharp edges. For an individual fine line of FIG. 6(A), it is not possible to resolve the width for the same reason that applies to the example of 50. The case of the fine scale Mexican hat wavelet applied to 14B in convolution 48 where it is possible to resolve the separation of transients corresponding to a single spatial structure is referred to as an resolved MSES or RMSES; the case of the coarse scale convolution 50 and the fine scale convolution 46 of the outline where for a single spatial structure it is not possible to resolve the separation between the transients is referred to as an unresolved MSES or UMSES.

Both RMSESs and UMSESs have a sign. For RMSESs, going from left to right in the WPT domain along the X direction corresponding to the transverse integration direction with respect to the rotated image, a negative peak immediately followed by a positive peak defines a positive RMSESs while a positive peak immediately followed by a negative peak defines a negative RMSESs. The direction refers to the direction on a photo-detector row such as associated with a digital camera. For UMSESs a positive peak immediately between two negative peaks defines a positive UMSESs while a negative peak immediately between two positive peaks defines a negative line.

As described in the previous example whether a MSES is resolved or unresolved may be determined by the peak responses of the continuous wavelet transform (CWT) applied to the transverse integration direction in the WPT. As in the example of FIG. 6, for the appropriate scale of a Mexican hat wavelet in the WPT, the response to a UMSES generates three peaks, while the response to a pair of RMSESs generates four peaks. An UMSES at a coarse scale can be a pair of RMSESs at a finer scale.

In the practice of the present invention for detecting a UMSES 1) test for a peak; 2) along a range of distances corresponding to the scale, before and after the peak, determine if there are two peaks of one-half magnitude and opposite sign; and 3) represent the UMSES in the UMSES representative data stream by a single peak at the position of 1), having magnitude and sign of the center peak. The magnitude will be the weighted average of the three peaks, i.e., the sum of absolute value of the three peaks divided by two.

In the practice of the present invention for detecting an RMSES: 1) test for a peak; 2) along the range of distances corresponding to the scale, test for one other peak having roughly the same magnitude and opposite sign in front of or behind the current peak; 3) in the opposite direction at the same distance test for the absence of a peak; and 4) in the RMSES representative data stream at the point corresponding to the midpoint between the two WPT domain peaks, insert a peak having the magnitude of the average of the two peaks. The sign will be determined by convention, i.e., if for the pair of peaks the negative is in front of the positive so let the sign be positive, otherwise let the sign be negative.

In the practice of the present invention, once we have RMSES and UMSES representative data streams we can now treat them separately in the subsequent post-processing.

In the practice of the present invention for finding a peak orientation for MSESs over a particular scale: 1) select a given peak in a RMSES or UMSES in the respective data stream; 2) at a corresponding X and Y position at different orientations as determined by a rotational transform compare the peak intensities; and 3) if the selected peak is greater and/or the values of the other peaks are symmetrically arranged about the selected peak, zero out all other peaks; 4) repeat this procedure for other peaks.

In the practice of the present invention, the peak detection and peak orientation detection stages greatly reduce the amount of data needed to represent an image. It is believed that a key attribute of biological vision systems is their ability to throw out redundant information. The application of the peak detection stage, the MSES type (UMSES or RMSES) detection stages, and the peak orientation detection stage applied to the WPT domain is herein referred to as the processed WPT. The processed WPT consists of a data stream of MSES representative quantities, being a sparse representation, it will be smaller in size than the original digital image.

In the practice of the present invention, the processed WPT defines a space where each MSES representative quantity (MSESRQ) has the following dimensions: position X, Y; orientation φ; and scale a. Relationships between pairs of these multi-scale edge segment representative quantities (MSESRQs) can be defined that are approximately invariant over scale, shift and rotation manipulations. For such a definition, let the ith MSESRQ point in the processed WPT, represent the ith point in the space of the processed WPT domain. Any two points in the processed WPT define a chord in wavelet projection transform (WPT) space. This has some relation to the chords in Hough transform space more fully described in the technical article of D. Casasent, "Optical Feature Extraction," *Optical Signal Processing*, J. L. Horner, ed., Academic Press, pp. 75–95, 1987 which is herein incorporated by reference. The chords defined by the ith & jth points in processed wavelet projection transform (WPT) space are given by the below relationships:

$$\Delta X_{ij} = X_i - X_j, \ \Delta Y_{ij} = Y_i - Y_j, \ \Delta \phi_{ij} = \phi_i - \phi_j, \text{ and } \Delta a_{ij} = a_i - a_j \qquad (4)$$

The WPT domain location of the ijth chord may be referenced by the ith MSES. Let this particular MSESRQ be referred to as the prime MSES.

The quantity $c_{ij} \equiv (c_{tan}^{ij}, {}_{\phi}c^{ij}, {}_{a}c^{ij})$, having tangential, azimuthal and scalar components, is referred to as the ijth chordal invariant (CI), where the below relationships exist:

$$c_{tan}^{ij} = \Delta Y_{ij} / \Delta X_{ij}, \ c_{\phi}^{ij} = \Delta \phi_{ij}, \ c_a^{ij} = \Delta a_{ij} \qquad (5)$$

This quantity $c_{ij}$ is approximately a position, scale and rotation invariant representation of the geometric relation between any thresholded wavelet projection transform (WPT) feature pair and may be further described with reference to FIGS. 7 and 8 respectively composed of FIGS. 7(A) and 7(B), 8(A) and 8(B). FIG. 7(A) shows the image of an F-16 aircraft and FIG. 7(B) shows a chordal invariant (CI) representation for the F-16 fighter. FIG. 8(A) shows the image of the F-16 aircraft rotated 45 deg. and dilated 25% relative to FIG. 7(A), and FIG. 8(B) shows the chordal invariant (CI) representation for the rotated and dilated F-16.

For general aspect invariance, chordal invariants (CIs) are calculated for all aspect views of a prototype object, such as the F-16 fighter. The CI allows spatial relations between MSESRQs to be efficiently expressed as sets of integers. This allows recognition of MSESRQs on a circuit based on conventional computer bus architecture which, in turn, allows the principles of the present invention to be practiced in a conventional computer making the invention more readily accepted into commerce. As to be described hereinafter, sets of addresses on a bus of the aforementioned circuit can serve as the reference library of the sets of chordal invariants (CI) corresponding to the prototypes, each address representing an individual chordal invariant (CI). A 100 MHZ 32 bit bus commonly available in conventional computers would perform 100 million correlations (to be described) per address per second, i.e., 100 million input CIs could be processed in 1 sec. The use of busses for serving as a reference library in an apparatus aspect of the present invention is to be further described hereinafter with reference to FIG. 13.

For recognizing the unknown object it is essential to characterize how large numbers of input MSESRQs associated with the correlated CIs relate to each other. These MSESRQs can be related to each other indirectly if they can be related to some fiducial point with respect to the prototype object. From a particular aspect view of the prototype object used to generate the library, we can define a fiducial point in the WPT domain of the image of the prototype object. All other points will have a unique relationship with this fiducial point. For convenience, we can make this point the center point of the prototype's WPT domain. For a particular aspect view of the prototype object, we can imagine the input image belonging to the same class and being a shifted scaled or rotated view of the prototype object view. This means that the center point of the input view will be shifted scaled and rotated with respect to the prototype's center point. We refer to this point in the WPT domain of the input image as the relative center (RC). For a particular aspect view of the prototype object, the ith prime MSESRQ associated with the ith CI is some distance in WPT space from the defined center (subscripted c). Let this distance be referred to as the chordal radius having components given below:

$$\Delta X_{ic} = X_i - X_c,\ \Delta Y_{ic} = Y_i - Y_c,\ \Delta \phi_{ic} = \phi_i - \phi_c,\ \text{and}\ \Delta a_{ic} = a_i - a_c \qquad (6)$$

The practice of the present invention defines a new quantity called the ijth center relation factor (CRF) with respect to the jth (unknown image) from the center $n_{ij} \equiv (n_x^{ij}, n_y^{ij}, n_\phi^{ij}, n_a^{ij})$ having the respective positional, azimuthal and scalar components where the following relationships exist:

$$n_x^{ij} \equiv \Delta X_{ic}/\Delta X_{ij},\ n_y^{ij} \equiv \Delta Y_{ic}/\Delta Y_{ij},\ n_\phi^{ij} \equiv \Delta \phi_{ic},\ \text{and}\ n_a^{ij} \equiv \Delta a_{ic}. \qquad (7)$$

Every CI will have at least one and possibly many CRFs associated with it.

The practice of the present invention redefines the indices so that, $C_k$, represents the kth chordal invariant (CI) of an input image, such as object 14 of FIG. 1, and $c_{ij}$, represents the jth chordal invariant (CI) in the processed WPT domain of the ith aspect view of the prototype object. The latter has just one of many like elements in the reference library of chordal invariants (CIs), stored in the computer vision system 10 in a manner as hereinbefore described. In regard to CIs, a correlation or match is said to occur where $c_k = c_{ij}$. For a given correlation, the center relation factor (CRF) associated with the reference chordal invariant (CI) stored in the library, is used to find the relative center (RC) corresponding to the input (unknown image) associated with the input kth chordal invariant (CI) of the unknown image of the object 14 provided by the camera 12 of FIG. 1. For the lth correlation for an unknown image, let there exist some lth relative center (RC) $(X_r^1, Y_r^1, \phi_r^1, a_r^1)$ having the respective components for position, azimuth and scale where the below relationship exists:

$$X_r^1 = X_k + n_x^{ij}\Delta x_k,\ Y_r^1 = Y_k + n_y^{ij}\Delta Y_k,\ \phi_r^1 = \phi_k + n\phi^{ij}\ \text{and}\ a_r^1 = a_k + n_a^{ij}, \qquad (8)$$

where $\Delta X_k$ is the kth chordal invariant (CI) distance between two points in wavelet projection transform (WPT) space along the X direction, $X_k$ is the X component of the position in wavelet projection transform (WPT) space of the prime MSESRQ with the kth chordal invariant (CI), and likewise $\Delta Y_k$ and $_kY$, $\phi$ is the kth azimuthal component of the relative center (RC) and $a_k$ is the kth scalar component.

It should now be appreciated that the wavelet projection transform (WPT) processing essentially consists of the transformation of image 18 of FIG. 1 into wavelet projection transform (WPT) transformation representation, a chordal invariant (CI) representation, chordal invariant (CI) correlation, and the performance of a relative center (RC) determination. These transformation, derivations and manipulations comprise the stages of the improved edge characterization means 22 generally illustrated in FIG. 1.

As seen in FIG. 1, after the performance of the improved edge characterization means process 22 the present invention sequences to the pattern recognition means 24 so as to recognize the target of interest 14 such as the unknown object 14 of FIG. 1. Matched filters for chordal invariant (CI) constellations representing various aspect views of the target of interest 14 of FIG. 1 might be defined in the practice of the present invention but it is preferred that a more advantageous utilization of the simplification the chordal invariants (CIs) representations provided by the improved edge detection means 22 of FIG. 1 be accomplished. It is preferred that an approach utilizes the hereinbefore given descriptions of expressions (2)–(8) to establish coherence among the input MSESRQs corresponding to correlated chordal invariants (CIs), to be further described hereinafter.

Chordal Triangle (CT) and Chordal Triangle Invariant (CTI)

The above invariant representation uses two chords which may cause it to suffer from an error problem due to the quantization error from coarse scale integration direction component of the above chordal invariant (CI), in the Y direction. An alternative approach uses three MSESRQs to derive invariant characterizations. From the processed WPT of an image consider any three MSES features which may be further described with reference to FIG. 9 composed of FIGS. 9(A) and 9(B) each illustrating three separate multi-scale edge segment (MSES) features 74, 76 and 78.

FIG. 9 shows graphically the positions, orientations and scales of three MSESRQs features 74, 76 and 78 projected back into Cartesion space. These three features 74, 76 and 78 correspond to three points in the processed WPT domain which, in turn, define three chords 80, 82, and 84 which, in turn, define a triangle 86. We refer to this triangle 86 as a chordal triangle (CT). One may form an equivalent triangle by the intersections of the long axes through the graphical MSESRQs features 74, 76 and 78 as shown in FIG. 9(B). Except for special cases, each side of the triangle 86 will have different lengths, i.e., long side, middle side and short side respectively, shown as chords 80 ($S_l$), chord 82 ($S_m$) and chord 84 ($S_s$). The chords 80, 82 and 84 are interchangeably referred to herein as the long side, the middle side and the short side. Since the CT is defined by intersections, the positions of these intersections are better determined along two dimensions than the equivalent positions of the solitary chord.

In the practice of the invention, we can refer to a particular chordal triangle's (CT's) position by the position in Cartesian coordinates of the intersection of a particular pair of sides, e.g., middle side and long side. In doing this, it is only necessary to maintain consistency in which two sides are used. The intersection by which the location of the CT is referenced is referred to as the prime vertex 88 of the chordal triangle (CT) which is shown in FIG. 10. FIG. 10 further illustrates the distance D 90, extending from the prime vertex 88 to the fiducial point Cen. The chord 90 extends from the origin 88. FIG. 10 still further illustrates angles $\Delta\phi_{Cen}$, $\Delta\phi_{ls}$ and $\Delta\phi_{ms}$ as shown therein.

In the practice of this invention, we can refer to a particular CT's orientation by the orientation of a particular side, e.g., the middle side 82. Henceforth, we will use the notation CT.phi for the orientation of the CT. We can refer to a particular CT's length by the length of a particular side, e.g., (82) the middle length. Henceforth, we will use the notation CT.r for the length of the CT. We can refer to the scale of a triangle by the scale of a particular side, e.g., the middle scale. Henceforth we will use the notation CT.a for the scale of the CT. For the above CT properties derived from one particular side, it is only necessary to maintain consistency in which side is used.

The chordal triangle (CT) of the present invention has a number of invariant geometric relations. For any change in position orientation and scale, the relations are maintained. This invariance property is referred to as shift scale and rotation invariance. We henceforth refer to the set of invariant relations of a CT as the CT Invariant (CTI).

In the practice of the present invention the components of the CTI may be listed as follows:

The angle between two sides, e.g., long side and middle side, (CTI.$\Delta\phi$).

The ratio lengths between two sides, e.g., long side and middle side, (CTI.rat).

In the practice of the present invention other CTI components may be listed as follows:
The difference in scale from the long side to short side (CTI.$\Delta a_{ls}$)
The difference in scale from the long side to middle side (CTI.$\Delta a_{lm}$)
The difference in scale from the middle side to short side (CTI. $\Delta a_{ms}$)
The difference in sign from the long side to the short side (CTI. $\Delta sign_{ls}$)]
The difference in sign from the long side to middle side (CTI.$\Delta sign_{lm}$)
The difference in sign from the middle side to short side (CTI. $\Delta sign_{ms}$)

The above three listed other components will have either two values, zero for no change or one for positive to negative or negative to positive.

In the practice of the present invention, still other CTI components may be listed as follows:
The difference in type from long side to short side (CTI.$\Delta type_{ls}$)
The difference in type from long side middle side (CTI.$\Delta type_{lm}$)
The difference in type from middle side to short side (CTI.$\Delta type_{ms}$)

The above three listed other components will have either two values, zero for no change or one for edge to line or line to edge.

The above invariantly characterizes the relations between MSESRQs 74, 76 and 78 as shown in FIG. 10. In other words, for all the MSESRQs, relations between groups of three MSESs (74, 76 and 78) are reduced to a list of numbers. As with the aforementioned CI approach, a CTI library is formed from the processed WPT of all aspect views of the prototype object.

Every input CT associated with every input will have a position corresponding to its prime vertex. As with the case of the aforementioned CI approach, for a given aspect view, the CTs associated with their respective CTIs are related to a fiducial point of a prototype object view by a center relation factor (CRF). For the CTI approach, the CRF is defined with components: 1) ratio of chordal triangle radius distance D to the triangle's length, defined by middle side length 82, symbolized as CRF.rat; 2) angular difference between the triangles (86) orientation and the direction to the center, symbolized as CRF.$\Delta\phi$; 3) the orientation difference between the triangle's orientation and the defined center orientation, symbolized CRF.$\Delta\phi$; 4) the difference between the triangles (86) scale and a defined center scale, symbolized CRF.$\Delta a$; and 5) the difference between triangle (86) edge type to defined center edge type, symbolized CRF.$\Delta type$.

As with the aforementioned CI, every CTI will have at least one and possibly many CRFs associated with it.

As with the aforementioned CI approach, upon correlating an input CTI, associated with an input image, such as image 18 of FIG. 1, with a library CTI, the CRF associated with a library CTI will be used to map the position of the triangle (86) associated with the input chordal triangle invariant (CTI) to a Relative Center (RC).

In the practice of the present invention for the CT, the components of the RC are defined by the following formulas:

Distance to the center, symbolized by RC.r, is the product CRF.rat * CT.r;

Direction to the center, symbolized RC.$\phi$, is the sum CRF.$\Delta\phi$+CT.$\phi$;

Orientation, symbolized RC.$\phi$, is the sum CRF.$\Delta\phi$+CT.$\phi$;

x direction position, symbolized RC.x, is the product RC.r*cos(RC.$\Delta\phi$);

y direction position, symbolized RC.y, is the product RC.r * sin(RC.$\Delta\phi$);

Scale, symbolized RC.a, is the sum CRF.$\Delta a$+CT.a;

Edge type, symbolized RC.type, is the sum CRF.$\Delta type$+ CT.type.

The pattern recognition approach used in this invention has been to reduce an image into its constituent features, in this case MSESs, and detect simple invariant relationships between these features, in this case CIs or CTIs, a kind of "divide and conquer" strategy. The next task that needs addressing is how the features associated with the detected invariants are brought together into the recognition of the unknown object.

To recognize the image of the unknown object, it is necessary to bind all the features together into a coherent pattern. Another way of thinking about this implementation is to search for a way to examine the feature of space of the image so that the coherence between the features is readily discernable. Some brain scientists theorize that pattern recognition in people and animals is characterized by patterns of coherent oscillation as more fully disclosed in two technical articles, the first being of C. M. Gray, P. Koenig, M. Engle and W. Singer, "Oscillatory Responses in Cat Visual Cortex Exhibit Inter-Columnar Synchronization which Reflects Stimulus Properties," *Nature*, v. 338, p. 334, 1989 and the second being of R. Eckhorn et al., "Coherent Oscillation: A Mechanism of Feature Linking in the Visual Cortex?," *Biol. Cyber.*, v. 60, p. 121, 1989, both of which technical articles are herein incorporated by reference. It has been theorized that patterns of coherent oscillation is somehow the basis of what is referred to as feature binding. Based on the practice of the present invention, it is believed that the purpose of learning is to associate a particular local feature of a given pattern with a corresponding code or reference signal such that, when the given pattern is observed, coherent superposition of the code signal occurs. Coherent superposition permits the amplitude of the code signal to rise above the background of incoherently superpositioned code signals permitting easy detection of the superposition. This detection results in recognition. The possibility that brains perform this process is an interesting alternative to the widely held "grandmother cell" hypothesis more fully disclosed in the already incorporated by reference technical article of S. W. Kuffler, J. G. Nicholls and A. R. Martin.

In the practice of the invention, it is preferred to use a method called noise coding to make many input MSESRQs coherent with respect to one another. Noise coding is very compatable with conventional computer pseudo-random number generation. The noise coding preferably used in the practice of this invention may be further described with reference to FIG. 11 composed of FIGS. 11(A), 11(B) and 11(C) respectively illustrating representations of a pseudo-random signal, a small number of coherent superpositions and a much larger number of incoherent superpositions of the pseudo-random signal of FIG. 11(A), and a correlation signal yielded by the correlation of the original pseudo-random signal of FIG. 11 (A) and the superposition of FIG. 11 (B).

In general, and as to be further described hereinafter, the method of the present invention for operating a computer vision system 10 derives the set of invariant relations previously described including a relative center (RC) quantity of the chordal invariants of the prototype objects forming the stored invariants 30 of FIG. 1. The derivation first generates at least a four (4) dimensional (D) pseudo-random sequence signals each having a phase parameter and with the corresponding coordinates equal to the wavelet projection transform (WPT) space dimensions of the at least first four (4) dimensional (D) signal representing the digital image 18. The method then lets the phases or wrap-around offsets along the respective dimensions of the dimensional-pseudo-random signals correspond to components of the relative center (RC) specifically $X_r, Y_r, \phi_r, a_r$ for the CI approach or RC.x, RC.y, RC.$\phi$ and RC.a for the CTI approach. A quantity known as the seed value is used in conjunction with a pseudo-random sequence generation algorithm to generate a specific pseudo-random sequence. This is well known in the art of random number generation. The method associates a unique seed with each library chordal invariants (CIs) or chordal triangle invariants (CTIs) corresponding to the prototype object from which they were derived.

The noise coding process generally involves the following five (5) steps some of which are visually correlatable to FIG. 11: 1) generate 4-D pseudo random sequence signals with dimensions equal to the wavelet projection transform (WPT) space dimensions (FIG. 11(A)) using seed values associated with the classes of library chordal invariants (CIs) (or CTIs) matched with the input CIs (or CTIs) and let an RC that is a function of an input MSESRQ associated with a correlated CI or CTI and corresponding library CRF determine the phases or offset values for all dimensions for a given pseudo-random sequence, where for any dimension, sections of the pseudo-random sequence that exceed the dimensional size limit are "wrapped around"; 2) generate correlation reference functions for the pseudo-random sequences corresponding to the various classes; 3) superpose the random sequences derived from all correlations or matches between library and input CIs (or CTIs) of which superposition is illustrated in FIG. 11(B), in which targets, that is, unknown objects 14 of FIG. 1, corresponding to the chordal invariant (CI) (or CTIs) library stored in the computer vision system 10 produce coherent superposition, whereas non-matching targets, noise or clutter produce incoherent superposition; 5) correlate the superpositioned pseudo-random signals of step 3) above with the correlation functions of 2), if a pattern of a particular class is in the input, there will be a coherent superposition of pseudo-random sequences corresponding to the particular class resulting in a well defined correlation peak in the correlation domain for that particular class, the position of the correlation peak will be determined by the pattern's positions in the WPT domain.

In the practice of the present invention, by thresholding W one can extract the wavelet projection transform (WPT) coordinates of the target, that is, the coordinates that define the location of the unknown object 14 of FIG. 1. From the wavelet projection transform (WPT) location yielded by the extracted coordinates one may then transform back to Cartesian space. In the practice of the invention, CAD software was used to generate multiple aspect views of an M1 Abrams tank. These views were used to make a reference library of chordal invariants (CIs) previously discussed and prestored in the computer vision system 10. Desert Storm photos of the M1 Abrams tank were digitized and their corresponding chordal invariants (CIs) were calculated and the results of the digitizing quantities were stored in the reference library (shown in FIG. 1 as stored invariants 30) of the computer vision system 10, and such chordal invariants may be further described with reference to FIG. 12 composed of FIGS. 12(A), 12(B), 12(C), 12(D), 12(E) and 12(F).

Overall, FIG. 12 shows selected aspect views of the M1 tank generated by the CAD software, input M1 tank photos, and their corresponding noise coding correlation functions. FIGS. 12(A) and 12(B) represent selected aspect views of M1 tank rendered from a CAD wireframe model, known in the art, used to generate chordal invariant (CI) library; FIG. 12(C) illustrates a Desert Storm photo of the M1 tank; FIG. 12(D) illustrates an output of noise coding stage, to be described, demonstrating recognition, that is, recognition of an unknown object 14 being the M1 tank determined by being compared against the stored chordal invariant (CI) in the reference library of the computer vision system 10; FIG. 12(E) is a second photo of the M1 tank; and FIG. 12(F) illustrates output of noise coding stage for second photo again demonstration recognition. A review of FIGS. 12(D) and 12(F) reveals that the correlation peak of each of FIGS. 12(D) and 12(F) is aligned with the center of the M1 tank (see FIGS. 12(C) and 12(E) respectively), thus showing recognition of the M1 tank.

It should now be appreciated that the practice of the present invention provides correlation between an unknown object 14 (M1 tank) and a prototype object (M1 tank digital representation stored in the computer vision system 10) by the use of noise coding techniques that form a stage of the superposition process of the present invention.

It should now be appreciated that the wavelet projection transform (WPT) of the present invention provides 4-D correlation that may be transferred back to 2-D Cartesian space coordinates in a very precise manner.

It should also be appreciated that the present invention provides a method of operating a computer vision system having a digital camera for detecting an unknown object having edge portions and converting the object into a first image represented by first digital quantities. The method comprising the steps of: (a) transforming a wavelet projection transform (WPT) of the first digital quantities into a first four (4) dimensional (D) signal; (b) superpositioning the 4-D signal against a stored pattern represented by a second signal also defined by four (4) dimensional (D) coordinates with the coherent phase portions therebetween serving as a superposition output signal; and (c) matching the superposition output signal against a library of prototype objects with the match therebetween identifying the unknown object.

Figure 13:
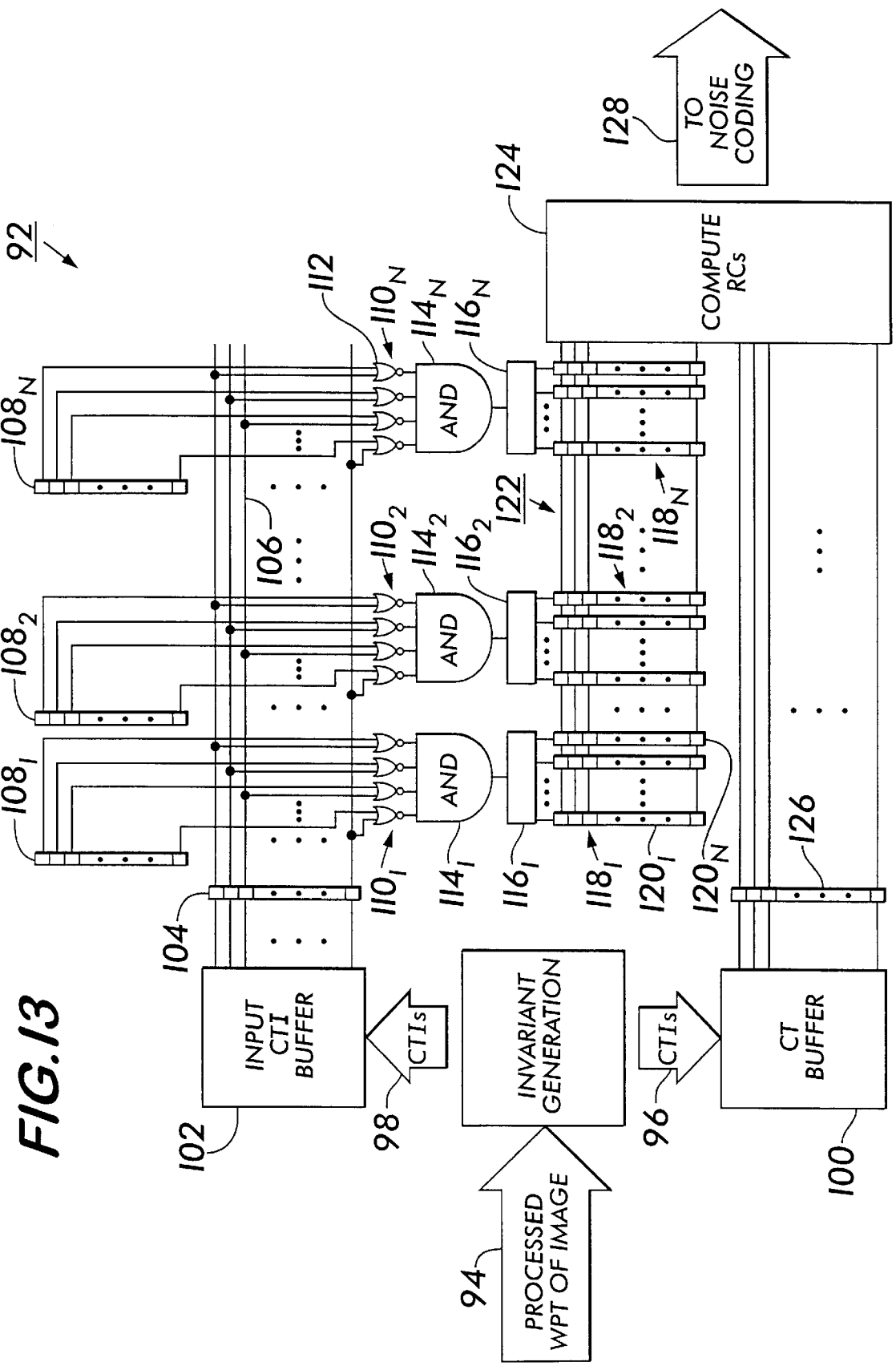
FIG. 13 illustrates a block diagram of circuit means for performing the processing associated with the present invention.

The correlation between the input invariants and derived invariants may be done on a circuit 92 that uses bus architecture as illustrated in FIG. 13. For this example CTs and CTIs are used but this may interchanged with the simple chords and CIs. Further, as will be described, the library of CTI quantities may be replaced with the library of CT with appropriate logic selections. Processed WPT data 94 is directed to invariant generator 29 (see FIG. 1) for generating data streams containing CTs 96 and CTIs 98 directed to respective CT buffer 100 and CTI buffer 102. The CTI data streams being an ordered group of digital parameters can be represented as a bit pattern. Input CTIs from the buffer 102 are then directed the register 104 serially according to the bus cycle. The bit pattern of the CTI contained in register 104 applies a corresponding voltage pattern to buslines 106. A CTI library resides in registers $108_1, 110_2, \ldots 108_N$ each providing a representative output of the prestored quantities (chordal triangular invariants), the outputs of which are routed in parallel to gate arrays $110_1, 110_2, \ldots 110_N$ each containing negated exclusive or NXOR gates 112, with each array having respective outputs directed into AND gates $114_1, 114_2 \ldots 114_N$. Furthermore, the arrays $110_1, 110_2, \ldots 1110_N$, containing two sets of leads, simultaneously receive signals from the input register 104 via the bus 106 so that each NXOR gate 112 in the arrays $110_1, 110_2, \ldots 110_N$ receives input from a bit position of a particular library register $108_1, 108_2, \ldots 108_N$ and a corresponding bit position of the input register 104. When the bit value of the bit position in a particular library register $108_1, 108_2, \ldots 108_N$ matches the bit value of the corresponding bit position in the input register 104, then the NXOR gate 112 corresponding to the bit position in the array $110_1, 110_2, \ldots 110_N$ and corresponding to the particular library register $108_1, 108_2, \ldots 108_N$ is qualified. Therefore when the contents of the input register 104 equals the contents of any of the prestored chordal triangle invariant (CTI) quantities, all the NXOR gates of the array are qualified such that the respective AND gate $114_1, 114_2, \ldots 114_N$ is qualified such that an activation signal is respectively routed to enabling means $116_1, 116_2 \ldots 116_N$.

A plurality of register groups $118_1, 118_2 \ldots 118_N$ of a number equal to a predetermined number, N, of the AND gates $114_1, 114_2 \ldots 114_N$ is connected to the enabling means $116_1, 116_2 \ldots 116_N$. Each of the registers groups $118_1, 118_2 \ldots 118_N$ stores CRFs associated with corresponding library CTIs and provide output signals in response to a control signal generated by the enabling means $116_1, 116_2, \ldots 116_N$ respectively. As previously mentioned, every CTI will have at least one and possibly many CRFs associated with it. Upon being qualified, by an above match, a particular enabling means $116_1, 116_2 \ldots 116_N$ controls the sequential transmission of CRFs stored in particular registers $120_1 \ldots 120_N$ of a particular register group $116_1, 116_2 \ldots 116_N$ along bus 122 to a RC computation means 124.

The arrangement 92 further comprises the buffer register 100 for holding the chordal triangles, that is, signals 96 (CTs). The buffer register 100 provides output quantities to a CT input register 126. Concurrent with the above CTI correlation and CRF transmission, the CT stored in the CT input register 126 is routed to the RC computation means 124. The RC computational processor 124 computes the RC signals 128 in a manner as previously described, and provides the output signals 128 that are subsequently routed to the previously described noise coding system.

Numerous other variations and modifications of the present invention may be readily apparent to those skilled in the art in light of the above teaching. It is, therefore, to be understood that, within the scope of the appended claims, the invention may be practiced other than as specifically described herein.

What we claim is:

1. A method of operating a computer vision system having a digital camera outputting a digital image, for recognizing an unknown object having multi-scale edge segment components by converting the digital image into a particular representation, said method comprising the steps of:

(a) transforming by a wavelet projection transform (WPT), said digital image into a first signal having at least four (4) dimensions and having corresponding space dimensions and defining a wavelet projection transform (WPT) domain;

(b) processing said four dimensional transform to find a set of representative quantities that correspond to constituent multi-scale edge segment (MSES) features of the digital image so as to yield an efficient edge feature decomposition of said digital image;

(c) grouping at least two MSES representative quantities into groups whereby a particular group is referable to as a location of a particular MSES representative quantity;

(d) deriving a set of invariant relations having associated parameters between the at least two MSES representative quantities of said group of step (c), said derived set being in said four dimensional transform space and having specific invariances which include shift, scale and rotation invariance within an aspect view;

(e) applying steps (a), (b), (c), and (d) to multiple aspect views of a prototype object and deriving a set of invariants having associated parameters for the said multiple aspect views and forming a library of said invariants for said prototype objects, and applying said steps (a), (b), (c) and (d) to the image of an unknown object;

(f) correlating said set of invariant relations of said step (d) to said set of invariant relations of step (e) so as to generate at least four dimensional digital signals which are representative of a particular class of prototype objects and have multidimensional phases which are functions of corresponding MSES representative quantities derived from the unknown image and parameters associated with the invariants derived from the prototype object; and (g) superposing the said representative signals of step (f) and storing the results such that the correlations and matches of digital image MSES components corresponding to those of the library of prototype objects result in coherent superpositioning of said representative signals and then determining the degree of coherence by performing a digital matched filtering operation with a reference signal derived from a representative signal of a particular class of prototype objects such that a correlation peak indicates the recognition of the unknown object in the digital image and the position of the correlation peak indicates the position of the recognized unknown object.

2. The method of operating a computer vision system according to claim 1, wherein said digital image of step (a) comprises first digital quantities and each of said prototype objects of step (e) comprises a digital quantity so that said correlation of step (f) identifies said invariant MSES feature relationships unknown object of step (e) as being identical to said feature relationships of the prototype object of step (e).

3. The method of operating a computer vision system according to claim 1, wherein said digital image of step (a)

being processed by step (b) of claim 1 to find said set of MSES representative quantities and each of said prototype objects of step (d) of claim 1 are at least four dimensional representations, said prototype objects being representative of a particular class of objects and having a fiducial point in the center of the said four dimensional transform domain of an image of the prototype object and having parameters associated with invariants that characterize the relationship of a MSES representative quantity to said fiducial point being a center relation factor (CRF) parameter.

4. The method of operating a computer vision system according to claim 3, wherein said match between input invariant and library invariant results in said multidimensional signal representative of said invariant class, the multidimensional phases of said representative signal are functions of the relative center (RC) which, in turn, is a function of the said CRF associated with said library invariant and the group of MSES representative quantities associated with said input invariant and coherent superposition between the representative signals corresponds to a proper identification of the unknown object.

5. The method of operating a computer vision system according to claim 4, wherein said coherence detection is performed a digital matched filtering operation using a reference signal representative of said prototype objects and said coherent superposition therebetween is represented by a peak quantity.

6. The method according to claim 1, wherein said digital image is represented by a two dimensional field of intensities and consists of an ordered list of digital values that may be formed into rows and columns of pixels and has two canonical axes corresponding to the directions along said rows and columns, said digital image being transformed by a wavelet projection transform (WPT) according to the following steps:
(a) performing a Cartesian rotational transform of said digital image for a predetermined number of times to incrementally varying orientations between 0 and 180 degrees;
(b) generating a copy of said digital image for each of said orientations;
(c) integrating about pixels of said rotated digital image copies of step (b) of claim 6 for each instantaneous orientation along a canonical axis of pixels of said digital image copy by using a digital low pass filter applied recursively to its downsampled output thus generating multiple levels of output, said digital low pass filter having filter coefficients selected from a low pass section of a discrete wavelet transform filter bank, said integrating being separately performed on each of said digital image copies of step (b) of claim 6; and
(d) differentiating said digital image copies of step (c) of claim 6 for each orientation along the transverse direction relative to said canonical axis of step (b) of claim 6 by using the continuous wavelet transform (CWT), said differentiating being separately performed on said rotated images having a range of scales, with instantaneous scale parameters occurring as a function of the level of the said digital low pass filter of step (c) of claim 6, whereby each scale of the CWT corresponds uniquely to a level on the said digital low pass filter.

7. The method according to claim 6 further comprising the following steps:
(a) finding the best points of the WPT of said image comprising the steps of:
(i) performing a peak detection process for each instantaneous orientation of the WPT along the directions having been processed by the CWT termed as the transverse integration direction of the WPT;
(ii) performing a process of comparing local groups of peaks along above said directions processed by the CWT to classify the best points as being representative of one of resolved and unresolved MSES types; and
(iii) performing a process of comparing across multiple orientations for a local spatial region by detecting said MSES types by testing for a symmetric pattern of said peak quantities about a particular MSES detection in a particular orientation of said WPT domain derived by steps (i) and (ii).

8. A method of operating a computer vision system according to claim 1, wherein said first digital image of step (a) of claim 1 comprises first digital quantities and each of said prototype objects of step (e) of claim 1 comprises digital quantities all including associated quantities of rotation, scale and position and invariant relations which, in turn, include one of chordal invariants (CIs) and chordal triangle invariants (CTIs) and center relation factors (CRFs) quantities such that a prime MSES representative quantity of said derived set of invariant relations of step (d) of claim 1 is mapped to a fiducial center in the WPT domain by a center relation factor (CRF) quantity of said CFR library associated with said invariant of step (e) of claim 1.

9. A method of operating a computer vision system according to claim 8, wherein said first digital image of step (a) of claim 1 comprises first digital quantities and each of said prototype objects of step (e) of claim 1 comprises digital quantities all including associated quantities of rotation, scale and position and invariant relations which, in turn, include chordal triangle invariants (CTIs) quantities and center relation factors (CRFs) quantities and said first digital image of step (a) of claim 1 further includes a prime vertex of said chordal triangle invariants (CTIs) quantities such that a prime vertex point of said derived set of invariant relations of step (d) of claim 1 is mapped to a fiducial center by a center relation factor (CRF) of said CRF library associated with said invariant library of step (a) of claim 1.

10. The method of operating a computer vision system according to claim 9, wherein recognition of the unknown object based on the matches of claim 1 between the CI or CTI library and the CIs or CTIs of the unknown objects is implemented by the steps of:
(a) generating at least four (4) dimensional (D) pseudo random sequence signals each having one of a phase parameter, i.e., offset parameter, and with the corresponding coordinates equal to the wavelet projection transform (WPT) space dimensions of said at least first four (4) dimensional (D) signal;
(b) letting the phases along the respective dimensions of the said dimensional pseudo-random signal correspond to components of the said relative center (RC) derived from the CRFs associated with the library CIs or CTIs and chords or CTs associated with the input CIs or CTIs; and
(c) associating a unique seed with each library chordal invariants (CI) or chordal triangle invariants of step (e) of claim 1 corresponding to a class or type of prototype objects associated with said chordal invariants (CIs) and chordal triangle invariants.

11. The computer vision system according to claim 8, wherein means for computing the relative center using said center relation factor (CRF) quantities comprises:
(a) buffer means for receiving said chordal triangle invariant (CTI) quantities and providing representative output signals thereof;

(b) input register means for receiving a single CTI quantity and applying a pattern of voltages on a busline connected to an array of library registers for the purpose of correlating the input CTI with the library;

(c) a library of prestored chordal triangle invariants quantities each providing representative output signals thereof;

(d) a plurality of NXOR gate arrays of predetermined number N, each array receiving output signals of said register means of said input chordal triangle invariant quantities and said register of a particular library chordal triangle invariant register such that if a particular bit of the said input register matches a corresponding bit of a particular library register then a corresponding NXOR gate associated with the particular said library register outputs a qualifying signal;

(e) a plurality of AND gates of a predetermined number, N, each AND gate receiving the output signals of said array of NXOR gates so that if the bit pattern of the said input register matches the bit pattern of a particular library register the AND gate associated with the said library register is qualified;

(f) a plurality of register groups of a number equal to said predetermined number N for storing said center relation factor (CRF) quantities, each of said storage register being responsive to a control signal for providing output signals representative of its stored contents so that each library chordal triangle invariant has one or more CRFs associated with it;

(g) a plurality of enabling circuits of a number equal to said predetermined number N and receiving an output signal of a respective AND gate and in response to the presence of said output signal of said respective AND gate generating said control signal so that said contents of said registers storing said center relation factors are applied to means for computing said relative center (RC) quantities;

(h) buffer means for receiving said center relation factor (CRF) quantities and routing said center relation factor (CRF) quantities to said means for computing said relative center (RC) quantities.

(i) buffer means for receiving input CTs; and (j) input register means for receiving input CTs concurrently with associated said input CTIs.

* * * * *